(12) United States Patent
Gullicksen

(10) Patent No.: US 11,050,758 B2
(45) Date of Patent: Jun. 29, 2021

(54) CONTROLLING ACCESS TO A COMPUTER NETWORK USING MEASURED DEVICE LOCATION

(71) Applicant: Gullicksen Brothers, LLC, Campbell, CA (US)

(72) Inventor: Jeff Gullicksen, Mountain View, CA (US)

(73) Assignee: Reavire, Inc., Campbell, CA (US)

( * ) Notice: Subject to any disclaimer, the term of this patent is extended or adjusted under 35 U.S.C. 154(b) by 176 days.

(21) Appl. No.: 15/452,451

(22) Filed: Mar. 7, 2017

(65) Prior Publication Data

US 2018/0063154 A1  Mar. 1, 2018

Related U.S. Application Data

(60) Provisional application No. 62/378,494, filed on Aug. 23, 2016.

(51) Int. Cl.
*H04L 29/06* (2006.01)
*H04L 29/08* (2006.01)
(Continued)

(52) U.S. Cl.
CPC .......... *H04L 63/107* (2013.01); *G01S 5/0081* (2013.01); *G01S 5/06* (2013.01);
(Continued)

(58) Field of Classification Search
None
See application file for complete search history.

(56) References Cited

U.S. PATENT DOCUMENTS

| 5,917,449 A | 6/1999 | Sanderford et al. |
| 6,249,680 B1 | 6/2001 | Wax et al. |
| (Continued) | | |

FOREIGN PATENT DOCUMENTS

| CN | 104902564 | 9/2015 |
| KR | 1020160000873 A | 1/2016 |
| (Continued) | | |

OTHER PUBLICATIONS

"CIA standards for Sensitive Compartmented Information Facilities (SCIF)", Jan. 30, 1994, 126 pages.
(Continued)

*Primary Examiner* — Henry Tsang
(74) *Attorney, Agent, or Firm* — BainwoodHuang

(57) ABSTRACT

A technique for controlling access to a network provides an electronic system that includes multiple antennas located in a physical space. The antennas receive wireless signals at their respective locations from devices within range of the antennas, and the electronic system processes the wireless signals as received by the antennas to measure locations of the devices relative to the antennas. The electronic system then allows or denies access to the network depending on whether the devices' measured locations are inside or outside a predefined physical region relative to the antennas. In this manner, only devices confirmed to be physically present within the predefined region are allowed to access the network. Devices outside the predefined region are physically blocked, such that no wireless communication with the network is possible.

24 Claims, 13 Drawing Sheets

(51) Int. Cl.
*G01S 5/00* (2006.01)
*G01S 5/06* (2006.01)
*H04W 12/08* (2021.01)
*H04W 48/04* (2009.01)

(52) U.S. Cl.
CPC .......... *H04L 63/0227* (2013.01); *H04L 67/18* (2013.01); *H04W 12/08* (2013.01); *H04W 48/04* (2013.01)

(56) References Cited

U.S. PATENT DOCUMENTS

| | | | |
|---|---|---|---|
| 7,692,532 B2 | 4/2010 | Fischer et al. | |
| 8,150,384 B2 | 4/2012 | Abifaker et al. | |
| 8,621,209 B1 | 12/2013 | Johansson et al. | |
| 8,656,473 B2 | 2/2014 | Hall et al. | |
| 9,001,120 B2 | 4/2015 | Steedly et al. | |
| 9,001,129 B2 | 4/2015 | Rhee et al. | |
| 9,041,622 B2 | 5/2015 | McCulloch et al. | |
| 9,084,217 B2 | 7/2015 | Wax et al. | |
| 9,288,632 B2 | 3/2016 | Yang et al. | |
| 9,516,503 B2 | 12/2016 | Berns et al. | |
| 9,674,726 B1* | 6/2017 | Holmer | H04W 24/10 |
| 9,843,772 B2 | 12/2017 | Lee et al. | |
| 2004/0080412 A1 | 4/2004 | Smith et al. | |
| 2006/0022815 A1* | 2/2006 | Fischer | G06K 7/0008 340/505 |
| 2006/0143292 A1* | 6/2006 | Taubenheim | H04L 63/10 709/225 |
| 2007/0060166 A1* | 3/2007 | Kitamura | H04L 43/045 455/450 |
| 2008/0155094 A1* | 6/2008 | Roese | G01S 5/02 709/224 |
| 2012/0117381 A1* | 5/2012 | Lo | G06F 8/63 713/156 |
| 2013/0172007 A1* | 7/2013 | Wax | H04W 64/00 455/456.1 |
| 2013/0244684 A1* | 9/2013 | Kadous | H04W 4/02 455/456.1 |
| 2014/0075510 A1* | 3/2014 | Sonoda | H04L 63/105 726/3 |
| 2015/0020188 A1* | 1/2015 | Segal | H04L 63/0245 726/13 |
| 2015/0310452 A1 | 10/2015 | Baitch et al. | |
| 2016/0026253 A1 | 1/2016 | Bradski et al. | |
| 2016/0127372 A1* | 5/2016 | Unterschuetz | H04L 63/105 726/4 |

FOREIGN PATENT DOCUMENTS

| | | |
|---|---|---|
| WO | 2013075125 | 9/2003 |
| WO | 2013028908 | 2/2013 |
| WO | 2014/176539 | 10/2014 |

OTHER PUBLICATIONS

Geolocation software—Wikipedia, Apr. 6, 2018, 4 pages.
Li Bing et al: CSI-Based WiFi-Inertial State Estimation; 2016 IEEE International Conference on Multisensor Fusion and Integration for Intelligent Systems (MFI), IEEE, Sep. 19, 2016, pp. 245-250.
International Application No. PCT/US2017/048203 International Search Report and Written Opinion including PCT/ISA/220, PCT/ISA/210, and PCT/ISA/237 to Gullicksen Brothers, LLC, dated Nov. 24, 2017, 14 pages.

* cited by examiner

CONTROLLING ACCESS TO A COMPUTER NETWORK USING MEASURED DEVICE LOCATION

CROSS-REFERENCES TO RELATED APPLICATIONS

Priority is claimed to U.S. Provisional Application No. 62/378,494, filed Aug. 23, 2016, the contents and teachings of which are incorporated by reference herein in their entirety. In addition, this application incorporates by reference the contents and teachings of U.S. application Ser. No. 15/347,551, filed Nov. 9, 2016.

BACKGROUND OF THE INVENTION

Field of the Invention

This invention relates generally to computer networks, and, more particularly, to techniques for selectively allowing or blocking access by devices to computer networks based on physical locations of such devices.

Description of Related Art

Commercial electronic devices commonly employ GPS (Global Positioning System) circuitry, which enables the devices to use location services in numerous ways, such as for mapping, navigation, weather forecasting, and other applications. Sometimes, online services access functions on user devices to obtain GPS data that identifies the locations of the devices. The online services may employ the GPS data to provide location-specific content or to validate user activity.

For validation, an online service might acquire GPS data from a user's smartphone, tablet, or other device, in order to confirm that the device is in an expected location. For example, if a user normally logs on to the online service from home, the service might flag a potential risk if a login arrives from some other location, such as in a different city or state.

SUMMARY

Unfortunately, GPS data can be spoofed or jammed, such that the data may become unreliable as a source of accurate location information. Also, GPS data is not usually available indoors, as a direct line of sight to GPS satellites is needed. Further, when used for verification purposes, GPS data is typically interrogated only after a network connection has already been established. Thus, for example, if a malicious user attempts to attack a computer network, the user may be able to connect to that network and cause damage, e.g., by inserting malware or performing other nefarious acts, before GPS data can be checked and the user can be blocked.

In contrast with prior approaches, which use GPS as a source of location information, an improved technique for controlling access to a network provides an electronic system that includes multiple antennas located in a physical space. The antennas receive wireless signals at their respective locations from devices within range of the antennas, and the electronic system processes the wireless signals as received by the antennas to measure locations of the devices relative to the antennas. The electronic system then allows or denies access to the network depending on whether the devices' measured locations are inside or outside a predefined physical region relative to the antennas. In this manner, only devices confirmed to be physically present within the predefined region are allowed to access the network. Devices found to be located outside the predefined region are physically blocked, such that no wireless communication with the network is possible. The improved technique does not rely on GPS and is nearly impossible to spoof.

In some examples, the electronic system measures device locations based on differences, across the antennas, in arrival times of packets originating from the devices. For example, a base station may group together instances of packets that arrive at the different antennas within a particular time interval, which may correspond to a reception range of the antennas. The base station may further group together instances of packets by matching device identifiers, which may arrive in packet headers, and/or by matching packet contents and/or other identifying features. Once arranged in groups, the base station computes a point of origin of the original packet, and tests whether the point of origin is inside or outside the predefined region. If inside, the base station may select a representative packet from each group, which the base station passes to a switch or router for introduction onto the network. If outside, the base station may simply ignore the packet, such that the packet never reaches the switch or router and thus never reaches the network. In some examples, additional properties of packets may be employed for measuring and/or confirming device location, such as angle of arrival and/or amplitude (e.g., signal strength or power).

Certain embodiments are directed to a method of controlling access to a computer network. The method includes receiving wireless signals by each of multiple antennas of an electronic system and processing the wireless signals received by the antennas to generate measured locations of electronic devices that originate the wireless signals. The method further includes allowing a first electronic device to communicate on the computer network via the antennas in response to a measured location of the first electronic device falling within a predefined physical region relative to the antennas, and blocking a second electronic device from communicating on the computer network via the antennas in response to a measured location of the second electronic device falling outside the predefined physical region relative to the antennas.

Other embodiments are directed to an electronic system constructed and arranged to perform a method of controlling access to a computer network, such as the method described above.

The foregoing summary is presented for illustrative purposes to assist the reader in readily grasping example features presented herein; however, the foregoing summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views. The drawings are not necessarily to scale, emphasis instead being placed upon illustrating the principles of various embodiments.

DETAILED DESCRIPTION OF THE INVENTION

Figure 1:
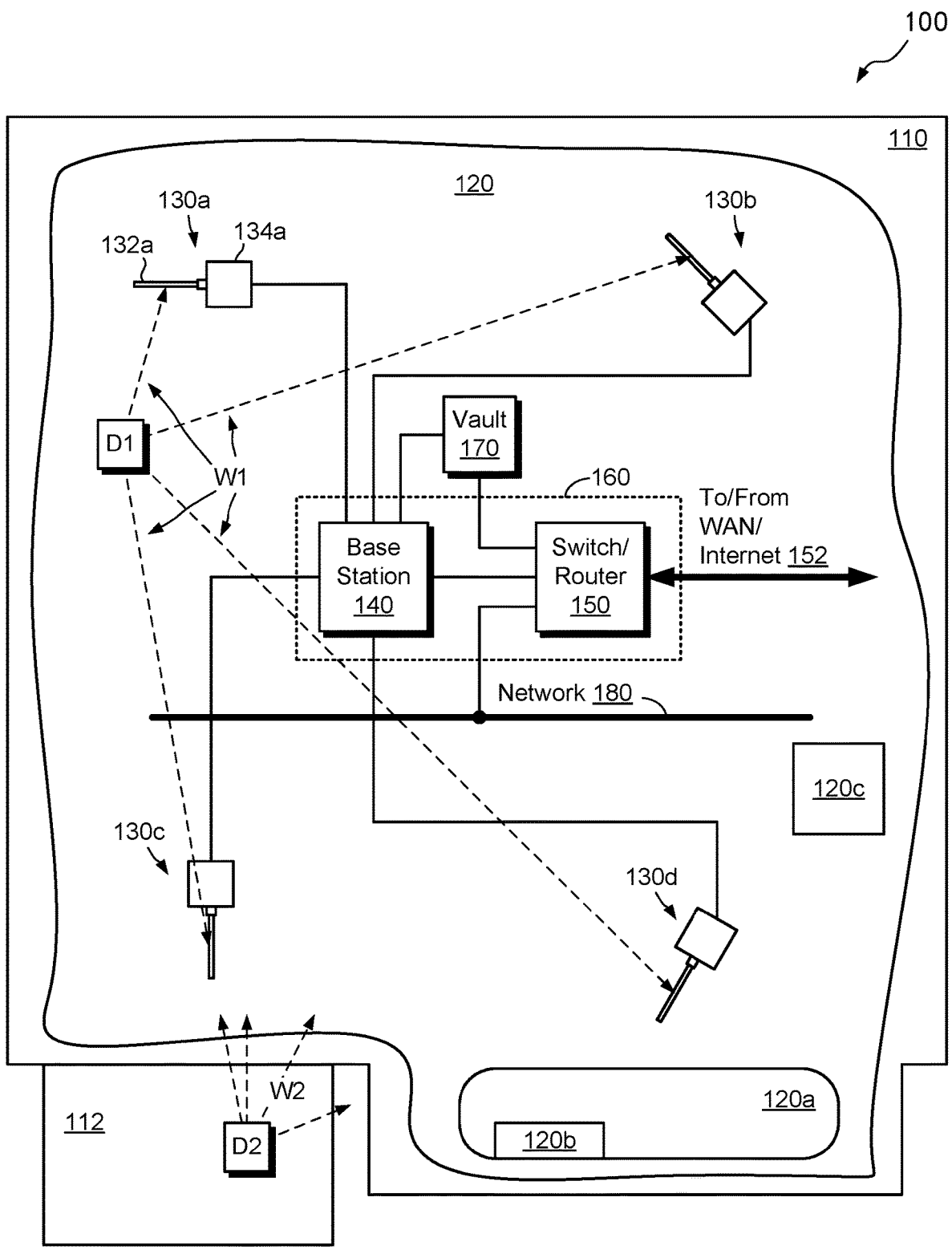
FIG. 1 is a top, plan view of an example environment in which embodiments of the improved technique hereof can be practiced.

Embodiments of the invention will now be described. It should be appreciated that such embodiments are provided by way of example to illustrate certain features and principles of the invention but that the invention hereof is not limited to the particular embodiments described.

An improved technique for controlling access to a network includes an electronic system having multiple antennas located at respective locations in a physical space. The antennas receive wireless signals from devices, and the electronic system processes the wireless signals as received by the antennas to measure locations of the devices relative to the antennas. The electronic system then allows or denies access to the network depending on whether the devices' measured locations are inside or outside a predefined physical region relative to the antennas.

Inspiration for certain embodiments is derived from the idea of a Sensitive Compartmented Information Facility, or "SCIF." As is known, a SCIF is a United States government-certified physical facility in which sensitive information can be accessed with minimal risk that bad actors can electronically eavesdrop. Construction of such facilities requires extensive shielding, as well as the use of certified computing equipment. Such facilities are expensive, and their use is generally limited to government actors.

Embodiments of the invention hereof aim to achieve certain protections and benefits normally limited to a SCIF in an inexpensive electronic system that is available to nearly everyone. The system is referred to herein as an "LPS System" (LPS stands for Local Positioning Service). The LPS system realizes what may be called a virtual SCIF, or "SKIF™." As will be described, a SKIF can be established in any volume of arbitrary size and shape. The volume may encompass a room or building and may be indoors or outdoors. An LPS system that uses at least four non-coplanar antennas can locate devices in three dimensions anywhere within the volume. Using only commercial-grade hardware, location accuracy can be at the level of single centimeters, thus enabling a SKIF to have boundaries as sharply defined as physical walls. Three-dimensional capability means that SKIFs may be deployed in multi-story apartments or in specified sections of a house, building, or outdoor space, with SKIFs at each level remaining distinct from SKIFs at other levels in three-dimensional space. Different SKIFs are preferably non-overlapping. In some examples, SKIF boundaries may correspond to boundaries set by a surveyor, and/or boundaries set by an administrative entity.

In an example, the antennas of an LPS system are placed at different locations and have overlapping ranges of reception and transmission. A space within range of all antennas is referred to herein as an "LPS zone," which defines an extent of the location service. A SKIF may be deployed within an LPS zone as a fully-enclosed space. The LPS system is thus capable of accurately measuring device locations both inside and outside the SKIF, provided the devices are within the LPS zone.

The LPS system receives mapping information that defines the boundaries of the SKIF relative to the antennas. The mapping information may be realized in a variety of forms, such as with physical measurements (e.g., positions and orientations of antennas) and/or with training. For example, an LPS system may be placed in a learning mode and securely paired with a particular device, which may circumnavigate the SKIF while the LPS system continuously measures its location. The LPS system may then compute the boundaries of the SKIF in three dimensions, based on the training data, and enforce those boundaries going forward.

A SKIF as defined in this manner shares many features with an actual SCIF. For example, wireless communications within a SKIF may be encrypted using keys that only registered devices can access, and even then only when those devices are physically located within the SKIF. Any devices outside the SKIF lack the encryption keys and are unable to eavesdrop on wireless communications transmitted from inside the SKIF. Only after devices have physically entered the SKIF is it possible for them to wirelessly communicate with other devices or equipment within the SKIF, and only then if they meet additional requirements, such as registration, authentication, and so forth. In addition, security of the SKIF is further enhanced when the SKIF is used in combination with a vault appliance, i.e., a device for securely storing and dispatching rights, as described in the incorporated U.S. application Ser. No. 15/347,551, entitled "VAULT APPLIANCE FOR IDENTITY VERIFICATION AND SECURE DISPATCH OF RIGHTS."

FIG. 1 shows an example environment 100 in which embodiments of the improved technique can be practiced. Here, a physical structure 110, such as a house, apartment, room, or the like, contains a SKIF 120. The SKIF 120 is shown as an enclosed space that approximately conforms to the walls of the structure 110. Within the structure 110 at respective locations are disposed four antenna assemblies 130a through 130d. Each antenna assembly includes an antenna (e.g., 132a) coupled to antenna circuitry (e.g., 134a). A user or installer may place each antenna assembly in a stable location with its respective antenna having a stable orientation. For example, the antenna assemblies 130a through 130d may be placed in corners of the space 110, where they may be fastened to walls or ceilings, placed in hard-to-reach places, and so forth. In an arrangement with four antennas (as shown), the antennas should preferably be oriented such that no three antennas are arranged in the same line and no four antennas are arranged in the same plane. As the extent of the SKIF 120 is defined relative to the antennas, any significant movement or reorientation of antennas once the SKIF 120 is defined may necessitate recalibration and/or retraining to the desired SKIF extent.

Different embodiments may employ different numbers of antennas. For example, three rather than four antennas may be used for locating objects in two-dimensional space. In general, N+1 antennas are needed to locate objects in N dimensions. Some embodiments may use greater than four antennas. In such cases, the LPS system may select four antennas (from among some larger number) based on location accuracy, e.g., because a selected combination of four antennas provides better location accuracy in particular areas than do other combinations of the available antennas. In such arrangements, no more than two of the four selected antennas should be arranged in the same line and no four should be arranged in the same plane.

In an example, the antennas 132 are similar to those used in conventional Wi-Fi (IEEE 802.11) communications. However, the antenna circuits 134 differ from conventional designs as they are configured to participate in device location measurements in addition to performing their usual functions of sending and receiving Wi-Fi signals.

As further shown in FIG. 1, each of the antenna assemblies 130a through 130d is coupled (e.g., using cables) to a base station 140, which is configured to compare and correlate information received from the antenna assemblies 130a through 130d. The antenna assemblies 132a through 132d and the base station 140 together form the "LPS System." The base station 140 is coupled to a switch/router 150, which may have a number of wired ports connected to a network 180, such as a LAN (Local Area Network) or some other kind of computer network. When provided as a router, the switch/router 150 may also have a WAN (Wide Area Network) port connected to a WAN or Internet 152. In some implementations, the base station 140 and the switch/router 150 are provided together in a single assembly, which may be referred to herein as an "LPS router" 160.

In the example shown, the environment 100 includes a vault appliance 170. As described above, the vault appliance, or simply "vault," 170 securely stores and dispatches rights. The vault 170 is connected to the LPS router 160. Preferably, the vault 170 and the LPS router 160 are located closely together and connect using a physical cable. In some examples, the vault 170 and LPS router 160 may be provided together in a single unit.

In example operation, a device D1, which is physically located within the predefined region of the SKIF 120, transmits a first wireless signal W1. The signal W1 propagates out in all directions and encounters the different antennas 132 at respective times. The antenna circuits 134 each measure a time of arrival (TOA) of W1 at the respective antennas 132 and transmit that TOA to base station 140. Base station 140 correlates TOA input from the antennas and computes a location of D1 based on differences in TOA as reported by the different antenna circuits 134. For example, four TOA measurements for W1 from the four antenna circuits 134 identify a single point in three-dimensional space, which the base station 140 may compute by sphere intersection. With the location of D1 determined, the base station 140 may test whether that location falls within the SKIF 120 our outside the SKIF 120. For example, the base station 140 compares the determined location to map information based on programming and/or training and concludes that D1 indeed is inside SKIF 120, as shown. In response to this conclusion, the base station 140 allows information contained in W1 to pass to the switch/router 150, where the information can enter the network 180 and potentially communicate with devices on the network 180.

Device D2 does not receive the same treatment, however. For example, D2 may be controlled by a person outside the structure 110, such as on a patio 112. D2 transmits wireless signal W2, which reaches each of the antennas 132 at respective times. Each antenna circuit 134 measures a respective TOA of W2 and passes the TOA to the base station 140, which computes the physical location of D2, using the same approach as described above. Here, however, the base station 140 concludes that D2 lies outside the SKIF 120. As a result, no information contained in W2 is passed to the switch/router 150. Rather, such information is physically blocked by the base station 140 and never enters the network 180.

As indicated above, the LPS system has the ability to measure location to centimeter-level accuracy. Separate and apart from whether device locations are measured to be inside or outside the SKIF 120, security measures acting within the network 180 may use fine-grain location information from the LPS system to inform security decisions. For example, the LPS system may define a subspace 120a that corresponds to a study or bedroom, and may further define a subspace 120b that corresponds to a desk. Security measures, e.g., those enforced by the vault 170, may require less authentication strength if a device is located in the subspace 120a than elsewhere, and may require even less authentication strength if the device is located on the desk (120b). Conversely, security measures may require greater authentication strength in other areas. For example, subspace 120c may represent a broom closet. The security measures may require very high authentication strength for any requests originating from subspace 120c. Indeed, security measures may define some areas as exclusion zones from which no amount of authentication strength will be sufficient.

Figure 2:
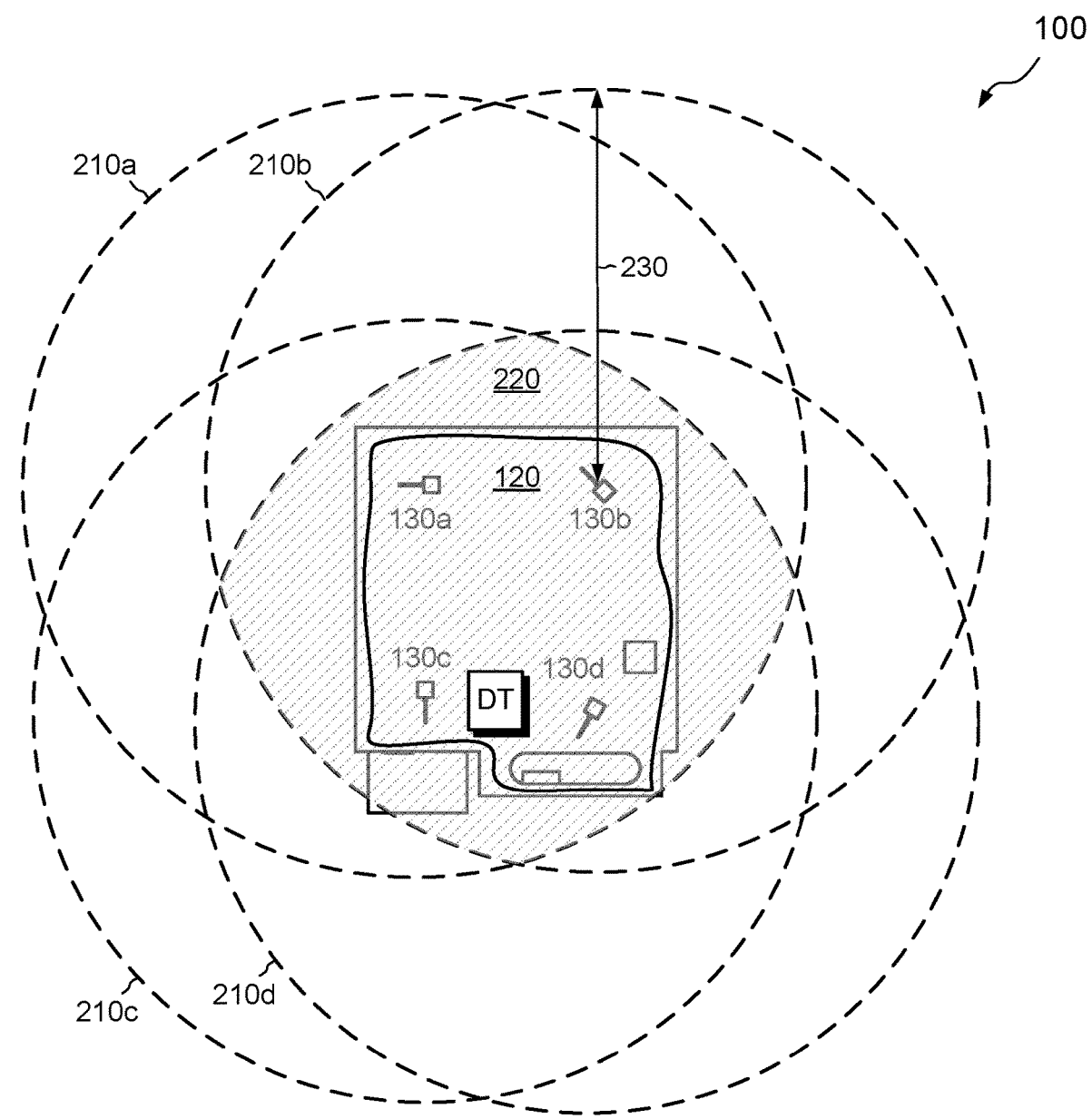
FIG. 2 is a top, plan view of the environment of FIG. 1, showing ranges of respective antennas.

FIG. 2 shows a more distant view of the environment 100 and indicates the range of each of the antennas. As shown, the antenna in assembly 130a has range 210a, the antenna in assembly 130b has range 210b, the antenna in assembly 130c has range 210c, and the antenna in assembly 130d has range 210d. The intersection of all four ranges 210a through 210d defines the LPS zone 220, which is the volume of space within range of all four antennas. The reader is reminded that the LPS zone 220 is a three-dimensional region, as each of the ranges 210a through 210d is approximately a sphere. As will be described further below, the range or each antenna in the LPS system (see distance 230) implies a minimum time interval (distance 230 divided by the speed of light) that the base station 140 may employ when grouping together wireless signals based on arrival time.

Also shown in FIG. 2 is a device DT, which the LPS system may employ for training. For example, a user may place the LPS system in a training mode and walk the device DT around the perimeter of the desired SKIF region to establish the SKIF's boundaries. Using location samples from DT in the different locations, the LPS system may generate a continuous volume and assign that volume to the SKIF 120.

Figure 3:
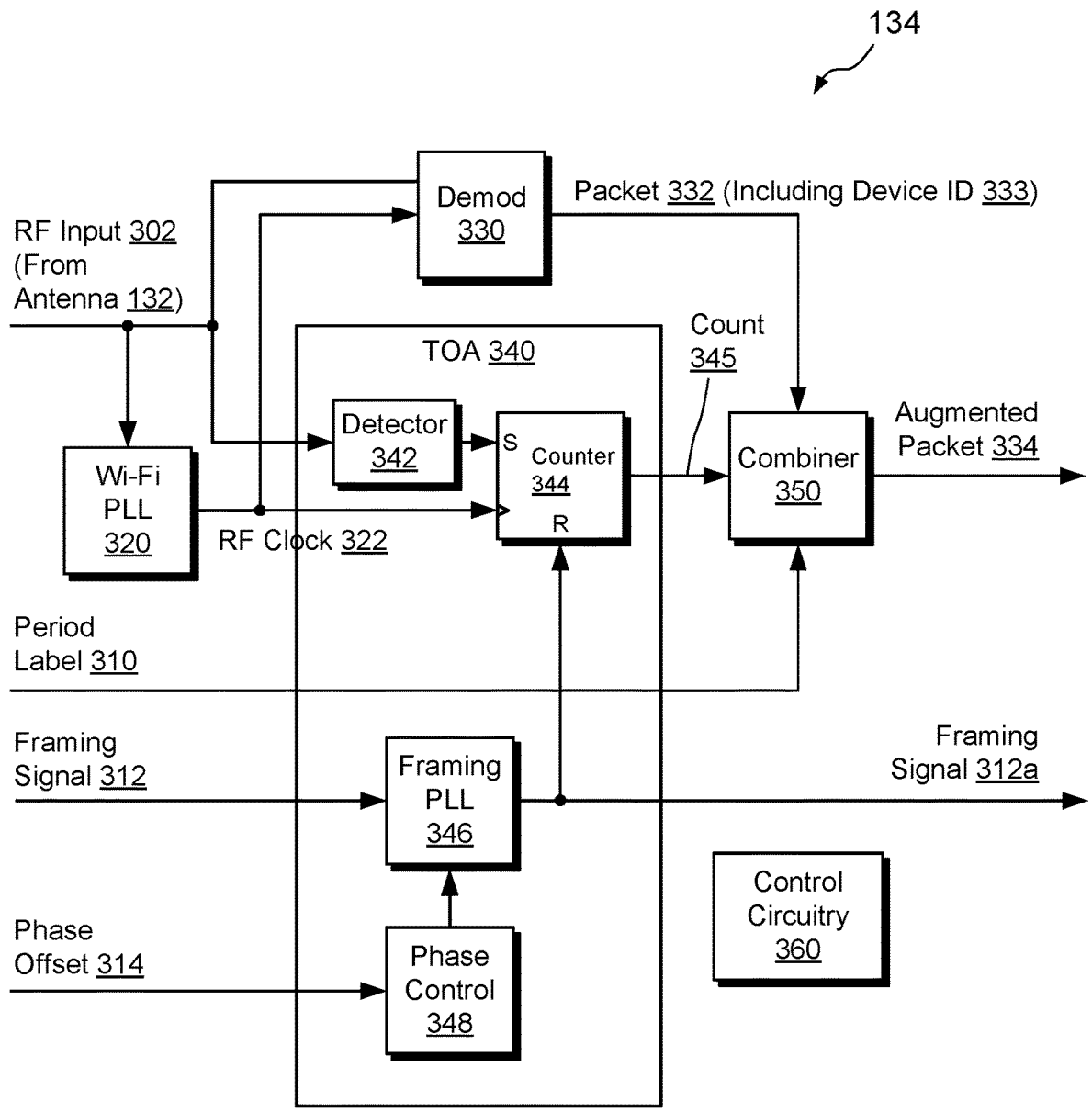
FIG. 3 is a block diagram of an example antenna circuit, which may be provided with each antenna of FIG. 1.

FIG. 3 shows an example antenna circuit 134, which is intended to be representative of the antenna circuits 134*a* through 134*d*. The antenna circuit 134 has an RF (Radio Frequency) input 302 for receiving an RF signal from the antenna 132 in the respective antenna assembly. The RF input 302 is coupled to a phase-locked loop 320 (Wi-Fi PLL), to a demodulator 330, and to a TOA (Time of Arrival) circuit 340. The TOA circuit 340 includes a detector 342, a counter 344, a framing phase-locked loop 346, and a phase controller 348. The antenna assembly 134 also receives input from the base station 140, in the form of period label 310, framing signal 312, and phase offset 314. A combiner 350 receives the period label 310 along with output from the demodulator 330 and output from the TOA circuit 340 and provides an output (augmented packet 334), which it sends back to the base station 140. Also returned to the base station 140 is framing signal 312*a*, which is a regenerated and potentially phase-shifted version of framing signal 312. Antenna circuit 134 further includes control circuitry 360. The control circuitry 360 includes one or more processors, memory, and in some cases firmware for controlling and orchestrating activities in the antenna circuit 134 and for managing communications with the base station 140.

In example operation, Wi-Fi PLL 320 generates an RF clock 322 of approximately 5 GHz or some other frequency that matches the center frequency of Wi-Fi signals received at the RF input 302. The RF clock 322 is distributed to the demodulator 330, which employs the RF clock 322 as a local oscillator to demodulate (down-convert) the RF signal received at the RF input 302 and to recover its information content. The information content may be provided in the form of packets 332, which the demodulator 330 provides as output. In an example, each packet 332 has a header that provides a device ID (identifier) 333, which identifies the particular device (e.g., D1 or D2; FIG. 1) that originated the packet 332. In an example, the device ID 333 is simply the MAC (Media Access Control) address of the originating device. The demodulator 330 may operate in this manner continuously, outputting packets 332 in real time as the signal from RF input 302 is demodulated and the packets 332 are recovered.

In parallel with operation of the demodulator 330, the TOA circuit 340 receives the RF clock 322 and the RF signal. The counter 344 has a clock input receiving the RF clock 322. The counter 344 generates an incremented count for each period (e.g., rising edge or falling edge) of the RF clock 322. Meanwhile, detector 342 detects the real-time arrival of packets in the RF signal, e.g., using energy detection, wave shape, and/or other features of the RF signal. The detector 342 generates an output pulse in response to detecting a packet. The counter 344 receives the output pulse at a STOP input (S), which directs the counter 344 to stop counting. In some examples, the counter 344 is configured to continue counting when the pulse arrives but to take a snapshot of its current value, which may be stored, for example, in a register (not shown). The snapshot helps to avoid spurious results. For example, if the detector 342 is falsely triggered by noise, a true detection that occurs later can supersede the earlier one and enable the counter 344 to produce an accurate count, despite the false triggering.

The counter 344 also has a START or RESET input (R), which can be activated to reset the counter 344 to an initial value from which the counter 344 again begins counting. In the example shown, the START input is triggered by a version 312*a* of the framing signal 312. The framing signal 312 may be provided as a clock (e.g., as a square wave or regular pulse train), which acts to synchronize timing across the antenna circuits 134. A framing PLL 346 generates the signal 312*a* as a potentially phase-shifted version of the framing signal 312. For example, phase control 348 may introduce a phase offset 314 into the framing PLL 346 to advance or delay the phase of signal 312*a*. The objective of controlling phase is to improve synchronization across the different antenna circuits 134, so that the counters 344 in the respective antenna circuits 134 all reset at the same time and count in lock-step, or nearly so.

For convenience, the period of the framing signal 312 may be established to be at least as long as the time interval implied by the distance 230 (FIG. 2). For example, an antenna reception range of 100 meters implies a frequency for the framing signal of 3 MHz, as light travels through air 100 meters in a single period of a 3 MHz clock. In some examples, the frequency of the framing signal 312 is user-adjustable and/or may be set automatically for a particular configuration of antennas. With a 3 MHz framing signal 312 and a 5 GHz RF clock 322, the maximum count of the counter 344 should normally be less than 1700, meaning that the counter 344 may be implemented with as few as eleven bits.

With the arrangement described, the counter 344 resets/restarts on every period of the regenerated framing signal 312*a*, e.g., every 333 ns for a 3 MHz frequency. A consequence of this arrangement is that packets as received by the different antennas must arrive within one period (333 ns) of one another to be considered valid. Thus, even identical packets arriving at different antennas more than one period apart would be rejected and blocked, as the packets could not possibly share a common origin.

The combiner 350 combines packets 332 from the demodulator 330 with counts 345 from the counter 344 and with period labels 310 from the base station 140 to produce augmented packets 334. For example, the combiner 350 checks the counter 344 each time the combiner 350 receives a packet 332 from the demodulator 330. The combiner 350 then provides the count from the counter 344 in the augmented packet 334 sent back to the base station 140. Period labels 310 help to distinguish between adjacent periods of the framing signal 312. For example, one antenna circuit 134 might receive a packet near the end of one period of the framing signal 312, while another antenna circuit 134 might receive the same packet near the beginning of the next period of the framing signal 312. Simply comparing counts 345 would thus give an incorrect difference in arrival times. If the two periods have respective labels 310, however, no error will result when the base station 140 compares the two counts 345, as labels 310 allow true timing measurements to be made between pairs of counts crossing period boundaries. In the described arrangement, only two unique period labels 310 are required, and the labels 310 may toggle on each period of the framing signal 312.

Figure 4:
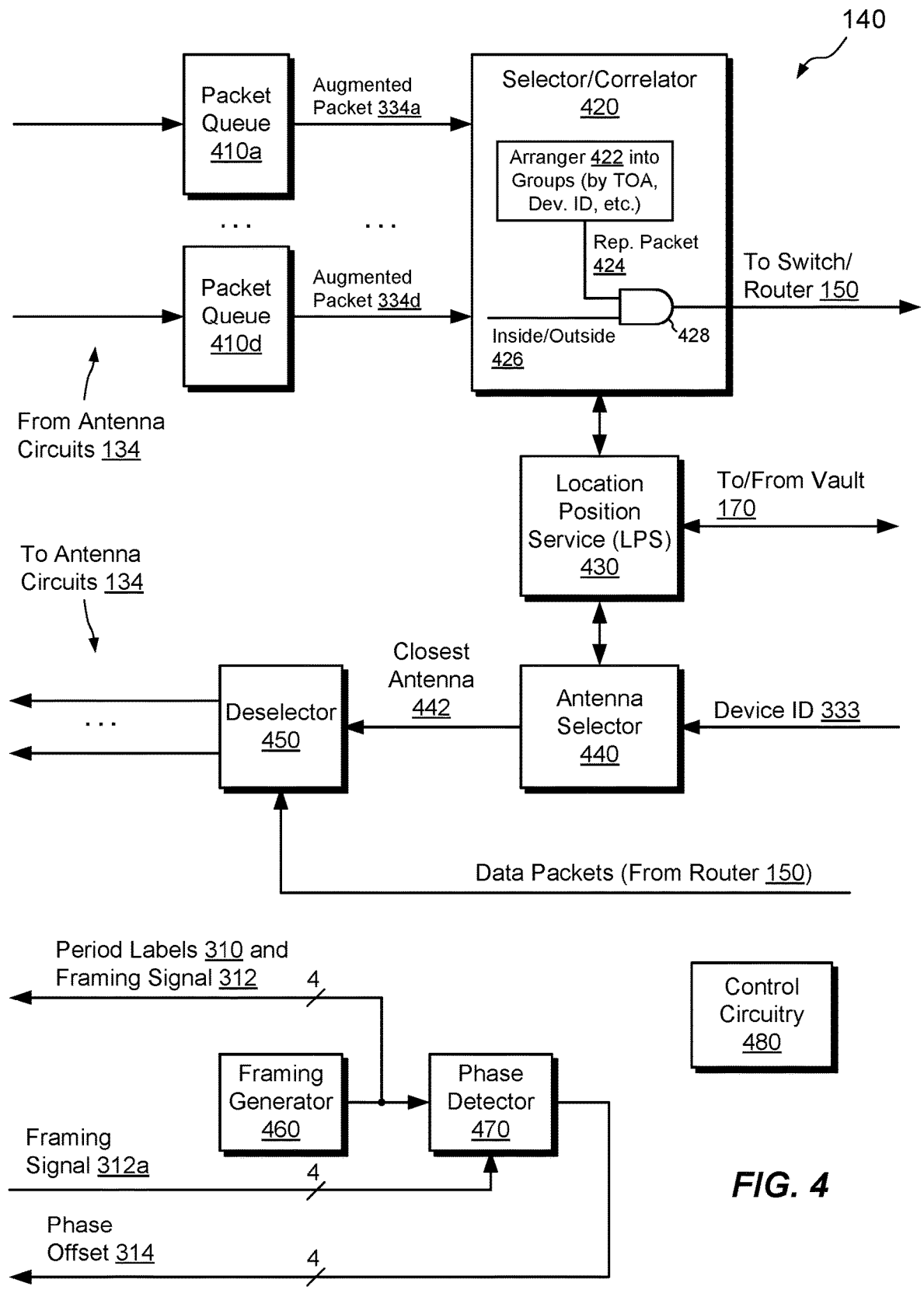
FIG. 4 is a block diagram of an example base station of FIG. 1.

FIG. 4 shows an example implementation of portions of the base station 140. As seen near the top of FIG. 4, the base station 140 includes packet queues 410*a* through 410*d*, which convey streams of augmented packets 334*a* through 334*d* arriving from respective antenna circuits 134*a* through 134*d*. A selector/correlator 420 receives the augmented packets from the antenna circuits 134 and arranges them into groups, where each group includes one packet from each antenna circuit 134. In an example, arranger 422 arranges packets into groups based on any combination of the following:

- Antenna, i.e., one and only one packet per antenna.
- Normalized time of arrival, e.g., based on counts 345 and period labels 310 that indicate a maximum difference between any two TOA values of less than one period of the framing signal 312.
- Device ID 333, i.e., by matching device IDs 333 as received in the headers of the augmented packets 334 such that all packets in a group originate from the same device.
- Packet contents, as all packets in the same group should have identical contents.

Unlike raw counts 345 from counters 344, normalized times of arrival take into account both counts 345 and period labels 310 to arrive at true differences in arrival times for packets assigned to any given group. Once packets have been arranged in groups, the selector/correlator 420 selects one of the packets in the group as a representative packet 424. The representative packet 424 may be any of the packets in the group. In a particular example, the representative packet 424 is chosen as the packet in the group that has the smallest normalized time of arrival, which indicates that the packet was received by the antenna from the originating device before any other antennas received it, and is thus most likely to be reliable.

For each group that is arranged, the selector/correlator 420 sends the normalized times of arrival of the packets in that group to a Local Positioning Service (LPS) 430, which applies the normalized times of arrival to generate a physical location of the originating device relative to the antennas. The LPS 430 may also compare the computed location against its map of the SKIF 120 (FIG. 1) to determine whether the originating device is inside the SKIF 120 or outside the SKIF 120. The LPS 430 may then generate an inside/outside flag 426. The selector/correlator 420 receives the flag 426 and applies the flag to logic 428. The logic 428 allows the representative packet 424 to pass to the switch/router 150 if the flag 426 indicates that the computed location is inside the SKIF 120, but blocks the representative packet 424 from passing to the switch/router 150 if the flag 426 indicates that the computed location is outside the SKIF 120. In this manner, the base station 140 allows packets to pass to the switch/router 150 only if the packets are confirmed to have originated from within the SKIF 120. Any packets originating from outside the SKIF 120 may simply be discarded. Operation may proceed in this fashion, with each packet adjudged on a per-packet basis to be inside or outside the SKIF 120 and thus allowed to pass to the switch/router 150 or blocked.

As further shown in FIG. 4, the base station 140 includes both an antenna selector 440 and a deselector 450, which the base station 140 may use for sending packets out to devices in the SKIF 120 (i.e., for egress of data rather than for ingress). Outgoing signals require only a single antenna. Antenna selector 440 contacts LPS 430 to identify the closest antenna 442 to the device addressed in the current outgoing packet, and deselector 450 directs the outgoing packet to the corresponding closest antenna.

As still further shown in FIG. 4, the base station 140 includes timing circuitry. The timing circuitry includes a framing generator 460, which generates the framing signal 312 and period labels 310 used by each of the antenna circuits 134a through 134d. In some examples, the timing circuitry also includes a phase detector 460. The phase detector 460 compares the framing signal 312 from framing generator 460 with a returned framing signal 312a from an antenna circuit 324 to generate a phase offset (or difference) 314, which propagates back to the same antenna circuit 324 for adjusting the framing PLL 346. Although not shown, switches or other selectors may be provided to use the same phase detector 470 for framing signals 312a and phase offsets 314 for the different antenna circuits 324. Alternatively, the base station 140 may provide a different phase detector 470 for each antenna circuit 324.

When receiving a phase offset 314, phase control 348 in an antenna circuit 134 (FIG. 3) may process the phase offset 314 before providing correction to the framing PLL 346. For example, the phase control 348 may divide the value of phase offset 314 in half, e.g., to account for the fact that the phase offset 314 is based on round-trip time from the base station 140 to the antenna circuit 134 and back, whereas the antenna circuit 134 requires phase correction only for one-way time.

The base station 140 also includes control circuitry 480. The control circuitry 480 includes one or more processors, memory, and in some cases firmware for controlling and orchestrating activities in the base station 140 and for managing communications with the antenna circuits 134, the switch/router 150, and the vault 170.

Preferably, the antenna circuits 134 and the base station 140 are constructed in a manner that prevents alteration by any user via software. For example, the antenna circuits 134 and base station 140 compute device locations in hardware and/or firmware, where operation cannot be affected by any user.

Figure 5:
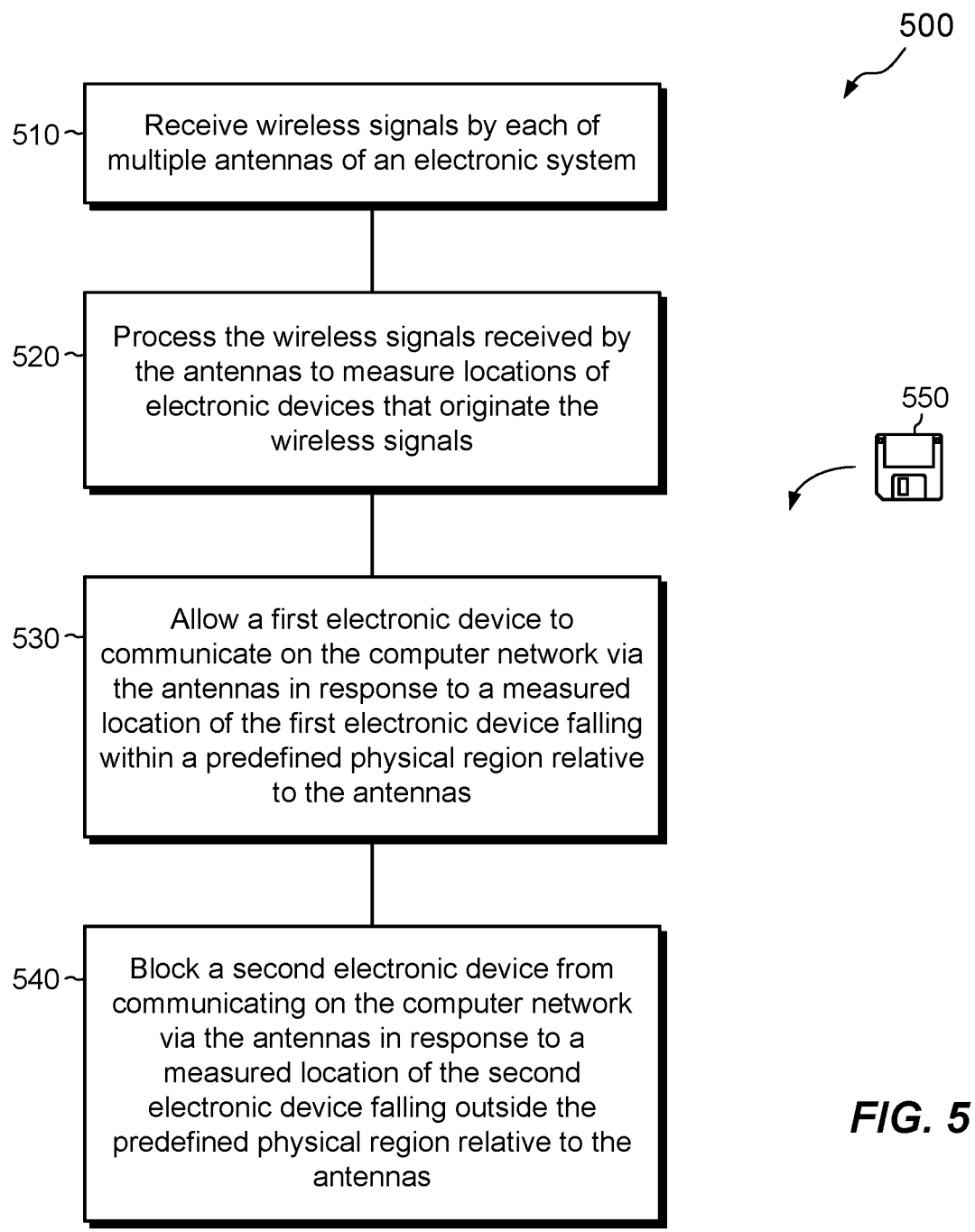
FIG. 5 is a block diagram showing an example method of controlling access to a computer network.

FIG. 5 shows an example method 500 that may be carried out in connection with the environment 100. The method 500 is typically performed, for example, by the structures and software constructs described in connection with FIGS. 3 and 4, which may reside in part in memory or firmware of the control circuitry 360 and 480 and are run by associated processors. The various acts of the method 500 may be ordered in any suitable way. Accordingly, embodiments may be constructed in which acts are performed in orders different from that illustrated, which may include performing some acts simultaneously.

At 510, wireless signals are received by each of multiple antennas of an electronic system. For example, multiple antennas 132 in an LPS system each receive wireless signals W1 and W2 (FIG. 1).

At 520, the wireless signals received by the antennas are processed to measure locations of electronic devices that originate the wireless signals. For example, antenna circuits 134 process wireless signals received from antennas at RF input 302 to generate counts 345 from counter 344 (FIG. 3), and the base station 140 processes counts 345 and period labels 310 from different antennas to calculate device locations (FIG. 4).

At 530, a first electronic device (e.g., D1) is allowed to communicate on a computer network 180 via the antennas 132 in response to a measured location of the first electronic device D1 falling within a predefined physical region (e.g., SKIF 120) relative to the antennas 132.

At 540, a second electronic device (e.g., D2) is blocked from communicating on the computer network 180 via the antennas 132 in response to a measured location of the second electronic device D2 falling outside the predefined physical region 120 relative to the antennas.

An improved technique has been described for controlling access to a network 180. The technique provides an electronic system that includes multiple antennas 132 located in a physical space 110. The antennas 132 receive wireless signals (e.g., W1, W2) at their respective locations from devices (e.g., D1, D2) within range of the antennas, and the electronic system processes the wireless signals as received by the antennas to measure locations of the devices relative to the antennas 132. The electronic system then allows or denies access to the network 180 depending on whether the devices' computed locations are inside or outside a predefined physical region 120 relative to the antennas 132. In this manner, only devices confirmed to be physically present within the predefined region 120 are allowed to access the network 180. Devices outside the predefined region 120 are physically blocked, such that no communication with the network 180 is possible.

Having described certain embodiments, numerous alternative embodiments or variations can be made. For example, although embodiments have been shown and described in connection with a vault 170, one should appreciate that certain embodiments do not require a vault 170.

Also, synchronization of antenna circuits 134 has been shown and described by adjusting the phase of the framing signal 312. However, synchronization may be achieved in other ways, such as by using calibration and correcting counts with arithmetic. For example, errors in counts 345 from antenna circuits may be corrected numerically once they are determined, with numerical corrections applied for TOA measurements going forward.

Also, embodiments have been shown and described in which the antenna circuits 134 are synchronized using a phase offset 314 from the base station 140. However, antenna circuits 134 may be synchronized in other ways, such as by receiving a separate reference clock (e.g., a GPS clock) or some other timing reference, whether it be received from the base station 140 or from some other source.

Also, it has been shown and described that the same antennas 132 that receive wireless signals from electronic devices are also used to transmit signals back to those electronic devices. This is not required, however. For example, one or more separate antennas may be provided in the system solely for transmitting wireless signals. In a particular example, antennas are furnished in pairs, with a first antenna of each pair designated as a receiver and a second antenna of each pair designated as a transmitter. The pairs may be provided in pair assemblies or kept separate.

Further, the base station 140 has been described as the component that either allows packets to pass to the switch/router 150 or blocks the packets. This is not required, however. For instance, the antenna circuits 134 may themselves pass or block packets, e.g., based on communication with an LPS component separate from the base station 140. The LPS component may compare times of arrival from different antenna circuits 134 and direct the antenna circuits 134 to pass or block the packets. For each packet to be passed, only a single antenna circuit 134 is required to send the allowed packet to the base station 140, with the selected antenna circuit 134 preferably being the one whose antenna 132 is closest to the originating device.

Further, measurements of device locations as described above involve comparing times of arrival of packets received by different antenna circuits 134; however, this is merely an example. Other techniques may involve measuring angles of arrival at the different antennas, signal strengths at the different antennas, and/or other factors. In some examples, the system uses time of arrival as a primary method of measuring device location, but applies angle of arrival and/or signal strengths for confirmation.

Further still, although features are shown and described with reference to particular embodiments hereof, such features may be included and hereby are included in any of the disclosed embodiments and their variants. Thus, it is understood that features disclosed in connection with any embodiment are included as variants of any other embodiment.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

Additional Information:

Additional novel features are presented below with reference to FIGS. 6-15.

Figure 6:
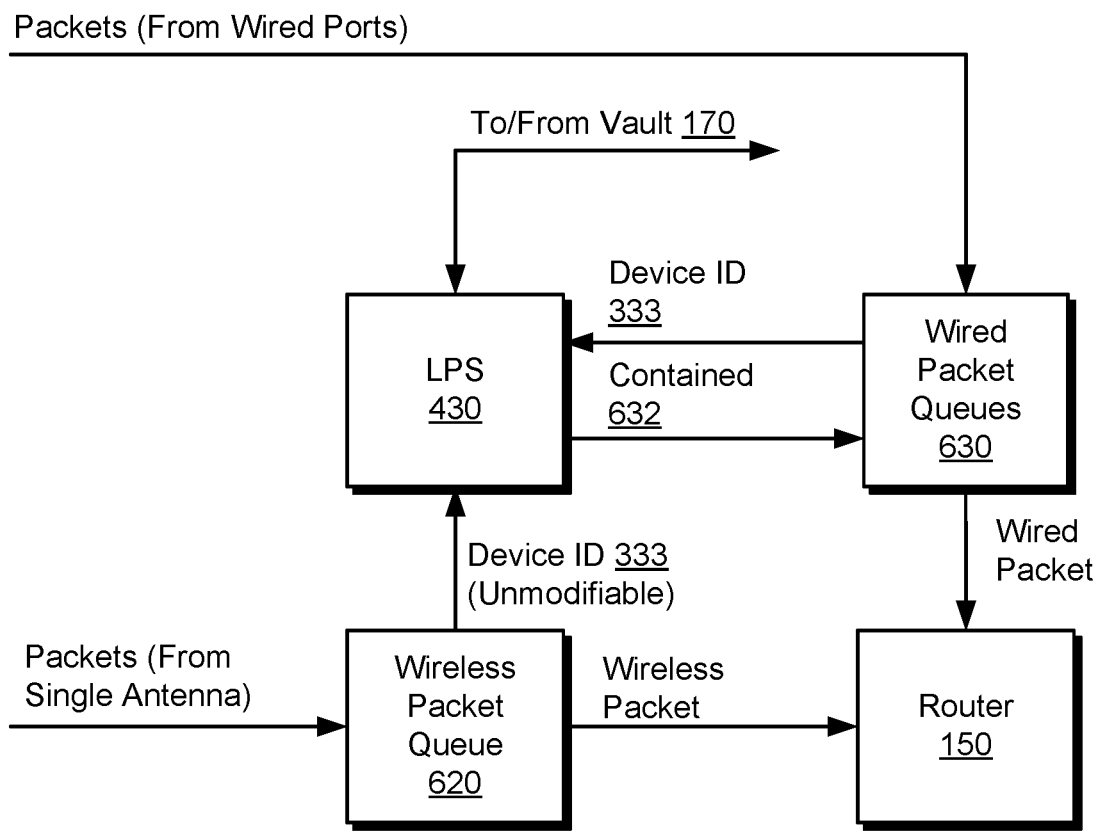
FIG. 6 is a block diagram of an example arrangement for providing secure access to a network when only a single antenna is used.

FIG. 6 shows an example of a single antenna SKIF. In single antenna systems, without the benefit of multiple antennas as described above, the extent of the LPS Zone 220 is the extent of the antenna. The single antenna prevents there being any ability to subdivide the LPS zone 220, so the SKIF 120 must correspond to the LPS Zone 220. What is lost in the single antenna SKIF is any ability to locate objects within the LPS Zone 220. What is kept is a definitive ability to determine wireless device and element inclusion in the LPS Zone 220, which may be achieved simply by detecting a wireless signal. FIG. 6 shows a simple implementation of a portion of the LPS Router 160 that provides the minimum requirements for the LPS system to perform in a non-spoofable manner. The essential point is that the device ID 333, or element ID (see below) is passed to the LPS system in hardware or firmware with no ability of software to modify this value. One simple way is shown, where a hardware input queue 620 is used before the router 150. The device ID 333 of each packet 610 is sent to the LPS 430.

In addition to these wireless functions, security could be further enhanced for wired connections by blocking all device ID's 333 on the wired ingress interfaces 630 that match those in the LPS 430. For example, wired packet queues 630 may forward device IDs 333 on incoming packets to LPS 430, which then replies with a response 632 that indicates whether the device is already identified as a wireless device. A well behaved wireless device will not normally appear on the wired interfaces as well.

FIGS. 7-11 show various aspects of a protocol for inserting an element into a SKIF 120. As described in the incorporated U.S. patent, the vault network must approve devices before they are considered to be vault network elements. The approval process insures that the Element follows all vault network protocols. Each vault network element is a member of an element class. The element class defines which rights may be executed on/for elements within the class. Each member of an element class is given a unique ID at manufacturing time. As shown at the top of FIG. 7A, an Element ID (EID) includes the following:

Class ID: Globally unique vault network-assigned identifier, which identifies a specific product type.

Element Class ID: Identifies the specific instantiation of a product within the class.

Figure 7A:
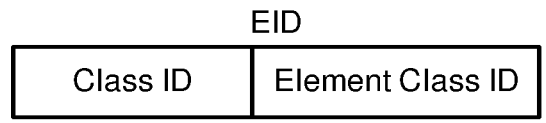
FIGS. 7A and 7B are diagrams that show an element identifier (EID) and an EID definition as may be stored in a classification server.
Figure 7B:
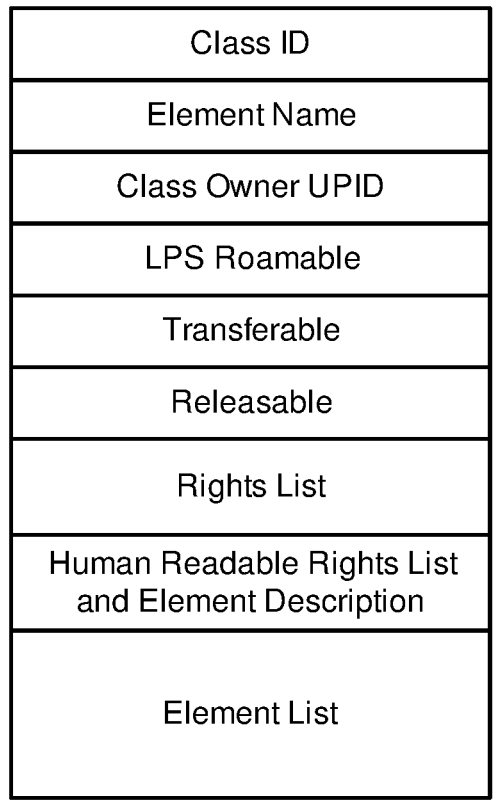

The classification server is a core server of the vault network that holds all element classes and their members. State is maintained for each member of a class. The classification server also holds all vault aware applications and vault aware devices in the same manner. An example element class is defined on the classification server as shown in FIG. 7B. The illustrated properties are as follows:

Class ID: The Class ID is a globally unique identifier assigned by the vault network.

Element Name: Human readable product name.

Class Owner UPID: This is the UPID that is assigned ownership of the class. It is through this UPID that the vault controlling/managing the class is found.

LPS Roamable: The class owner gives permission for an element of this type to move between LPS Zones.

Transferable: The class owner gives permission for an element of this type to have ownership transferred to another user.

Releasable: The class owner gives permission for an element of this type to be released from use within a Skif and free to use anywhere. The element is outside the scope of the vault network during the time it is released. Only rare element types should allow this, as the entire purpose of elements is to exist in the protective zone of the Skif.

Rights List: The list of rights that may be executed in association with the element. These are the types of rights that the local vault is permitted to use to control or share secrets with the element.

Human Readable Rights List and Element Description: Each right associated with the element type is briefly explained as well as the Element itself.

Element List: This is the list of all assigned elements for the given class. This list is expanded as new elements are manufactured as opposed to preloading the list with potential elements. This is a security precaution to ensure that hackers do not attempt to activate illegally created elements or that manufacturers do not to attempt to sell unauthorized elements.

Figure 8:
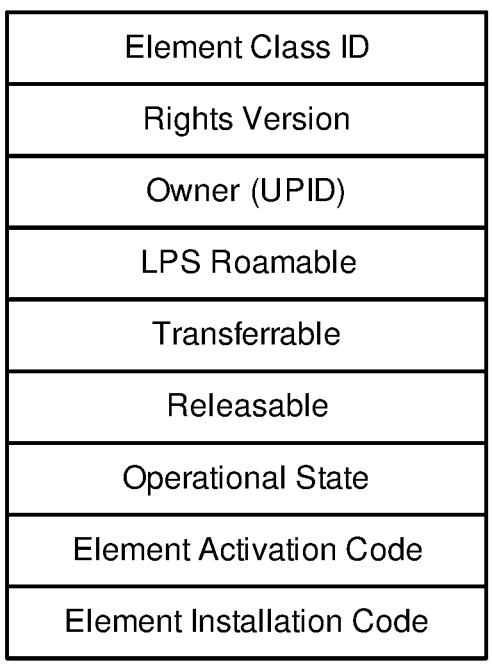
FIG. 8 is a diagram showing an example element list as may be provided in the EID definition.

As shown in FIG. 8, example fields in the Element List are as follows:

Element Class ID: The vault network assigns these ID's in blocks as the elements are manufactured.

Rights Version: This points to which version of rights this particular element supports from the class. Software updates to elements may change the rights associated with an element. This field is controlled by the vault and the software install and updates performed therein.

Owner (UPID): This field is necessary. The UPID of the owner of the element is typically assigned by the owner's vault at installation time. The Element Activation Code and Element Installation Code permit the element owner's vault to assign this value. Ownership can be transferred.

LPS Roamable: If the class allows LPS Roaming, the user may choose to allow or deny.

Transferable: If the class allows element ownership transfer, the user may choose to allow or deny.

Releasable: If the class allows release of the element, the user may choose to allow or deny.

Operational State: States of the element, defined below.

Element Activation Code: This code must be presented to the element in order for it to activate. The manufacturer is responsible for creating this code. The code need not be unique; this permits simpler manufacturing for low cost, low security elements.

Element Installation Code: The manufacturer provides this code. This code is provided to the user as part of the installation procedure. Depending on the requirements of the element, it could be manually entered by the user or part of the software installation package.

Figure 9:
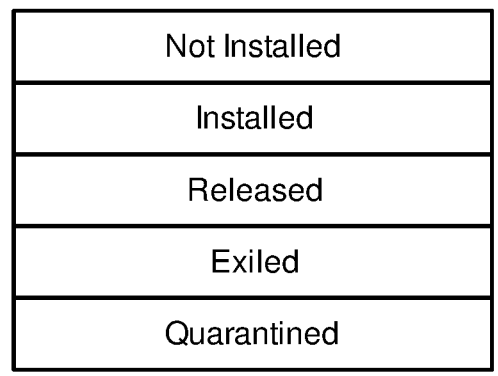
FIG. 9 is a diagram showing example values of an operational state as provided in the element list of FIG. 8.

As shown in FIG. 9, example values of the operational state are as follows:

Not Installed: The element may have been installed before. This state does not differentiate whether an element has been previously installed or not.

Installed: The element is installed. This is from the point of the view of the vault network. The element itself may be broken or non-operational. The classification server is not privy to that detail.

Released: The element is not contained within a Skif. No rights may be executed on it. The element is not participating in the vault network.

Exiled: The vault network has determined that the element is violating vault network protocols and has been removed from the vault network. This is part of the self-defending nature of the vault network.

Quarantined: The element is suspect. Execution of rights is limited.

Elements may be installed into the LPS Zone 220 with the help of the classification server. Elements are tightly bound to the SKIF 120 as the vault 170 is the sole component that communicates with the elements. Users execute rights on the vault 170 in order to operate/interact with elements.

The following encryption keys are used within the protocols listed below.

Kse: This is a session key for use between the vault and element. This key is used during the setup procedure of the element.

Kscs: Session key between the vault and the classification server.

Keck: This stands for Element Control Key. It is a rolling key that changes for each use. The session to the element is maintained at all times to decrease response times. The keys roll to increase security.

Element Secret: This is a secret generated by the element to bind the element to the vault. This is required for the vault to reclaim the element.

Vault Element Secret: This is a secret generated by the vault to bind the element to the vault. This is required for the vault to reclaim the element. ES and VES are similar in function to the deep blind secrets of the vault.

Kees: This is a one-time use key for performing an Emergency Element Shut-down of the element.

Ksvv: Vault-to-Vault session key.

Figure 10:
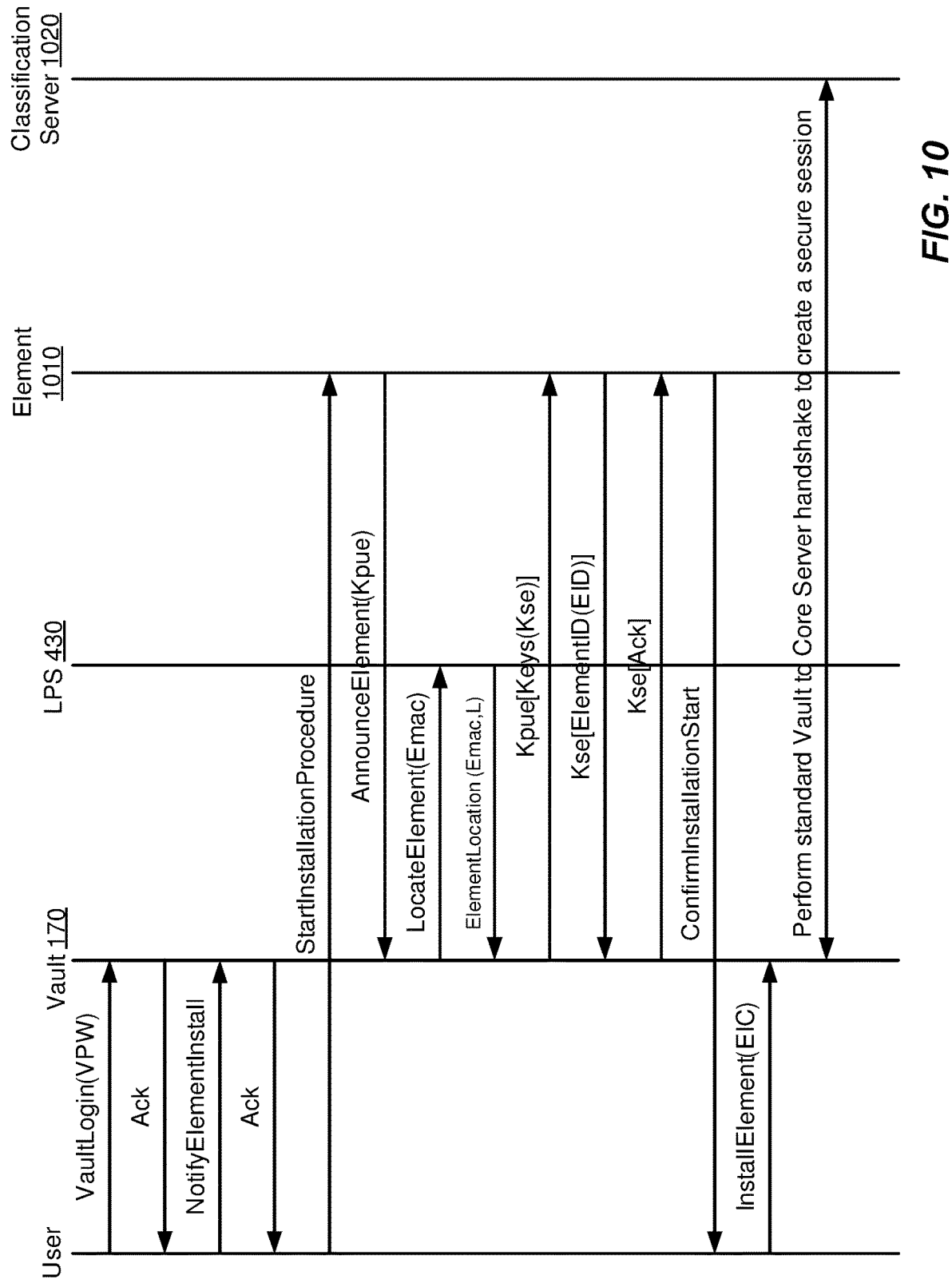
FIG. 10 is a sequence diagram showing an example protocol for installing an element in a local vault network.

FIG. 10 shows an example element installation sequence, in which the following activities are performed:

1. VaultLogin(VPW): The user logs into the vault.
2. Ack: The vault acknowledges the user log in.
3. StartInstallationProcedure: The user must physically go to the element being installed and perform the appropriate initialization action. This is dependent on the actual element type, but it might be as simple as holding the power button down for 15 seconds.

4. AnnounceElement(Kpue): After the user successfully starts the initialization procedure, the element announces itself to the vault. Since this message is not encrypted, it must contain no information about the element itself other the public key for the element, Kpue.

5. LocateElement(Emac): The vault asks the LPS system to locate the element, with the given MAC address. The announce packet trained the LPS system as to the location of the element.

6. ElementLocation(Emac,L): The LPS system responds back with the location of the requested element. The vault determines that the element is within the LPS Zone. Note that after the vault learns of the type of element being installed, it could reject installation if it is not in an appropriate location.

7. Keys(Kse): The vault gives the element a session key to start a secure session so that the vault may learn the type of element being installed.

8. ElementID(EID): The element responds with the Element ID, EID.

9. Ack: The vault acknowledges the start of the secure session and the receipt of the Element ID.

10. ConfirmInstallationStart: The element then confirms to the user that the installation procedure is starting and that the user should go back to the vault to continue the procedure. The confirmation could be as simple as a blinking light on the element but could also be words on a display or an auditory signal.

11. InstallElement(EIC): The user goes back to the vault and enters the installation code, EIC, for the element. The EIC is provided to the user in the packaging of the element. If the EIC is lost, it can be retrieved by contacting a vault network administrator. For very low cost elements or elements where security is not an issue, the EIC can be fixed and preloaded in installation software.

At this point the vault creates a secure session to the classification server. This standard procedure is not shown to save space.

Figure 11:
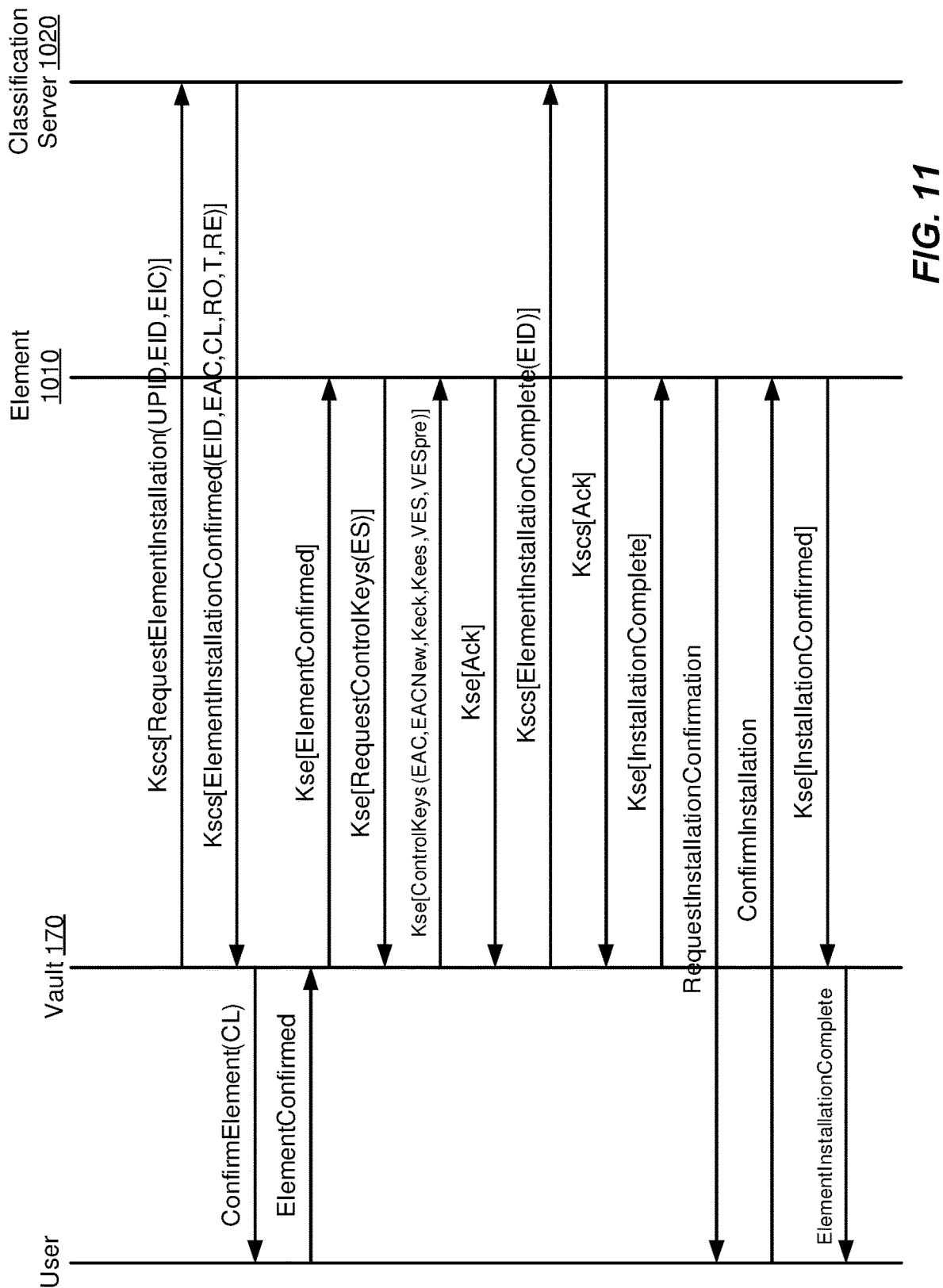
FIG. 11 is a sequence diagram showing an example procedure for creating a secure session between a vault and the classification server.

FIG. 11 shows a continuation of the example element installation sequence, in which the following additional activities are performed:

12. RequestElementInstallation(VID,UPID,EID,EIC): The vault performs the standard vault to core server handshake with the classification server before sending this message. This message is a request to install the element in the given vault, with the given UPID as the owner of the element. The EID is provided to identify the element and the EIC is provided to prove that the user has the right to perform this installation.

13. ElementInstallationConfirmed(EID,EAC,CL,RO,T,RE): The classification server checks the state of the element to see if that EID is available to install. If it is, then the classification server sends the Element Activation Code (EAC) and Classification List (CL) to the vault. The EAC is required to activate the element. For low cost elements, the EAC may very well not be unique for every element of a given type. For higher cost elements. the EAC will most likely be unique for each EID. CL is a list of abilities that this EID is capable of. When a right is executed on an element, the vault checks against the CL to see if the right can be executed by that element. CL also contains a human-friendly description of the element. RO tells the vault if the element is permitted to roam. T informs the vault if the element is transferrable. RE informs the vault whether the element may be released.

14. ConfirmElement(CL): The vault displays the human-friendly description of the element to the user.

15. ElementConfirmed: The user confirms to the vault that this is the type of element he intended to install.

16. ElementConfirmed: The vault confirms to the element that it has been found in the classification server.

17. RequestControlKeys(ES): The element requests control keys from the vault. The element passes an Element Secret (ES) to the vault to bind ownership of this element to the owner of the element. This is similar to the deep blind secrets of the vault.

18. ControlKeys(EAC,EACNew,Keck,Kees,VES,VESpre): To write a new EAC, the present one is needed. This gives ownership of the element to the vault in question and should anything happen, only this vault has the ability to reactivate the element. If the vault dies, the EAC is stored in the Vault Data so it is backed up. There is no fear that an element will be left stranded. The new EAC, EacNew, is only given to the classification server if the element is released from use by the current user. Keck, element control key, is a rotating control key that vault uses to send commands to the element. Keck is changed on every use. If it were not changed, then simple replay attacks could cause the element to take an action. Kees, element emergency shutdown key, is used to shut down the element in case of an emergency. Obviously, the hope is that this key never gets used, but if it does, it is single use and must be changed. The Vault Element Secret, VES, is used to bind the element to the vault. It acts as a deep identifier much like the deep blind secrets of the vault. VES is stored in compare only memory so the previous value, as the vault sees it, is needed to write the new VES.

19. Ack: The element acknowledges the receipt of the control keys.

20. ElementInstalltionComplete(EID): The vault then informs the classification server that installation is complete for the given EID. The classification server changes the state of the element to show that it is installed.

21. Ack: The classification server acknowledges the installation of the element.

22. InstallationComplete: The vault tells the element that installation is complete.

23. RequestInstallationConfirmation: The element requests the user to confirm the install. This is mostly to avoid confusion on the part of the user. The request could be as simple as a blinking light to indicate a button needs to be pushed.

24. ConfirmInstallation: The user confirms the installation by physically doing something to the element, such as pushing a button.

25. InstallationConfirmed: The element informs the vault that installation is complete.

26. ElementInstallationComplete: The vault informs the user that installation is complete. Once again this is mostly to let the user know that all players in the protocol are aware of the element, and it is fully installed. This avoids any possible confusion on the part of the user.

Using an Element in Another SKIF

Figure 12:
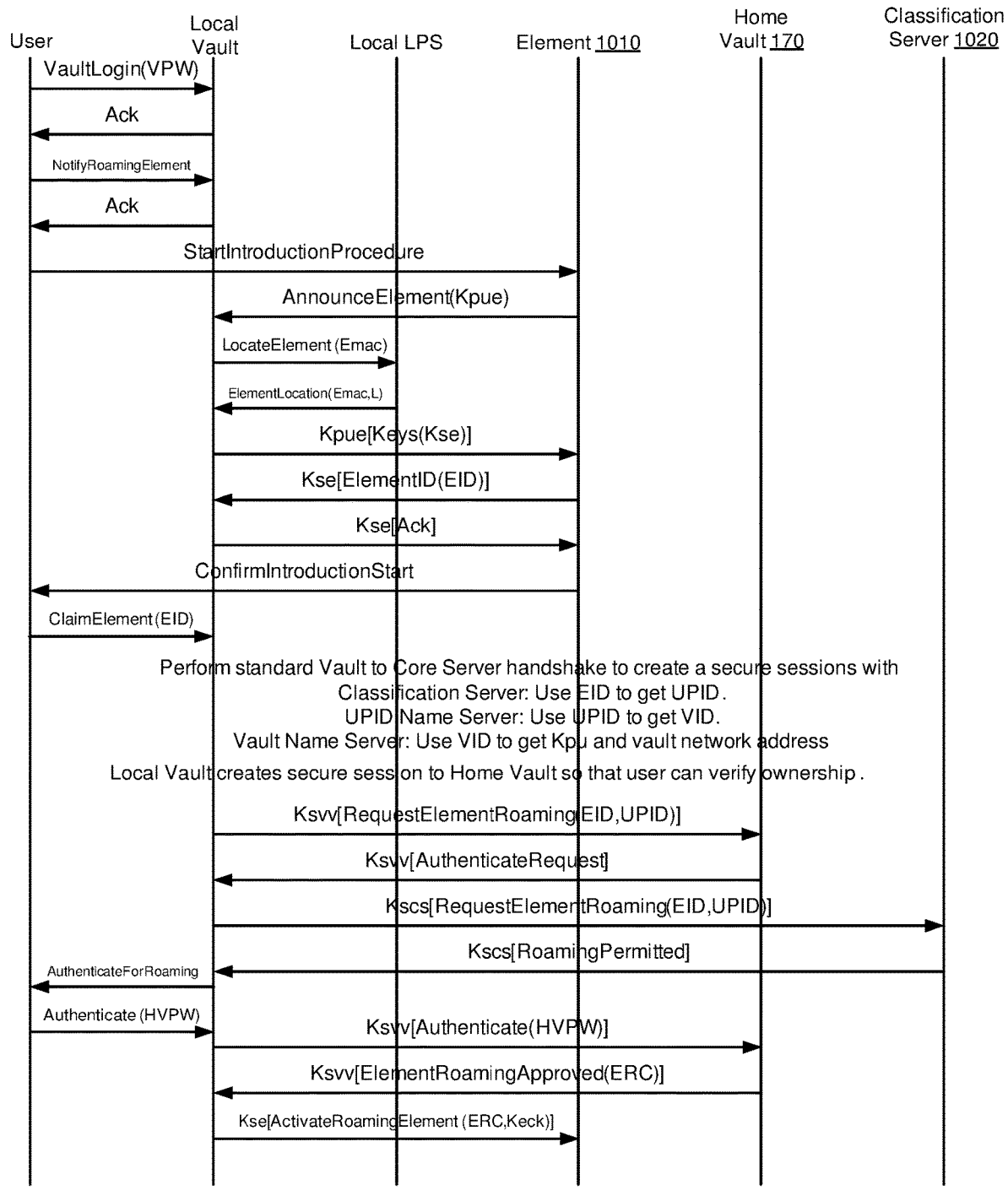
FIG. 12 is a sequence diagram showing an example protocol for using an element when roaming to a foreign vault network.

FIG. 12 shows an example protocol for using an element in another SKIF, also known as roaming of visiting. Some elements must be usable in another SKIF, and some elements should be tied to exclusive use within the owner's home LPS Zone. A light switch is an element that does not need to be able to visit another LPS Zone. It could of course be uninstalled in one LPS Zone and installed in another LPS Zone, but this is not visiting, i.e. LPS roaming. A game controller is a good example of an element that should be able to visit other LPS Zones.

Some elements are by their nature not capable or not intended by the manufacturer to be transferred between LPS Zones. Hence the manufacturer must permit this explicitly. Therefore, when an element is presented into an LPS Zone for a visit, the local vault must not only check the home vault of the element owner but also check the classification server.

The act of element roaming is accomplished via the execution of a content right on the home vault of the element owner. Successful execution of the right releases the necessary secrets for the element to work in the local LPS Zone.

FIG. 12 shows the following activities:
1. VaultLogin(VPW): A user of the local vault logs onto the local vault.
2. Ack: Vault acknowledges login.
3. NotifyRoamingElement: The user instructs the Vault that an element will be visiting the Skif.
4. Ack: Vault acknowledges instruction and waits for an element to announce.
5. StartIntroductionProcedure: The user instructs the element to announce itself. Typically this would simply be turning the element on or pressing a reset button.
6. AnnounceElement(Kpue): The element announces itself to the local vault. (This is routed to the vault because it is vault traffic, using the concept of a flow. This avoids the element needing to know the address of the local vault.)
7. LocateElement(Emac): The vault asks the LPS system to locate the element to determine if it is a legal position to announce itself.
8. ElementLocation(Emac,L): The LPS system responds back with the location of the element.
9. Keys(Kse): The vault sends a session key to the element so that the rest of the introduction protocol may be done in private.
10. ElementID(EID): The element responds back with its element ID, EID:
11. Ack: The vault acknowledges receipt of the EID.
12. ConfirmIntroductionStart: The element signals the user that it is ready to be introduced to the vault. It typically does this by blinking an indicator light.
13. ClaimElement(EID): The owner of the device then steps in and claims the device. (Note that it does not matter which user performs this action. Logically, the owner of the device is saying this is my element.) The user would choose the device from a list of detected visiting devices. Typically this list will be very small (one element). Choosing the element on the list translates to the EID. The user does not enter an EID.

At this point the local vault contacts the classification server to get the UPID of the element owner. Then the local vault contacts the UPID Name Server to get the VID of the home vault of that UPID. Then the local vault contacts the vault name S server to get the public key and network address for that VID. Finally the local vault contacts the home vault and creates a secure session.

14. RequestElementRoaming(EID,UPID): The local vault requests the home vault to allow the given element to roam in the local LPS Zone.
15. AuthenticateRequest: The home vault asks for authorization from the owner of the element.
16. RequestElementRoaming(EID,UPID): The local vault asks the classification server if it is ok for this device to roam. This order is chosen to promote the self-defending nature of the vault network. If the vault said it was ok but the classification server said it was not ok, then the vault is hacked and can be punished.
17. RoamingPermitted: The classification server tells the local vault that roaming is permitted for this element type.
18. AuthenticateForRoaming: The local vault asks the element owner to authenticate himself for the purposes of element roaming.
19. Authenticate(HVPW): Since this is a right execution being authenticated, the form of authentication need not be the Hierarchical Vault Password (HVPW). See "1192-001-Vault" for other possible authentication methods. This is the standard method for authenticating an element to roam.
20. Authenticate(HVPW): The local vault sends the HVPW to the home vault for right authentication and execution.
21. ElementRoamingApproved(ERC): Upon execution of the content right the code, ERC, is released and sent to the local vault. The mechanism for this is an action field in the right triggers a read of the ERC from the element profile.
22. ActivateRoamingElement(ERC,Keck): The local vault informs the element that it may be used for roaming in this SKIF. The ERC is used to inform the element that the proper permission has been granted. The rolling key Keck is sent for use in the local vault to element session.

Figure 13:
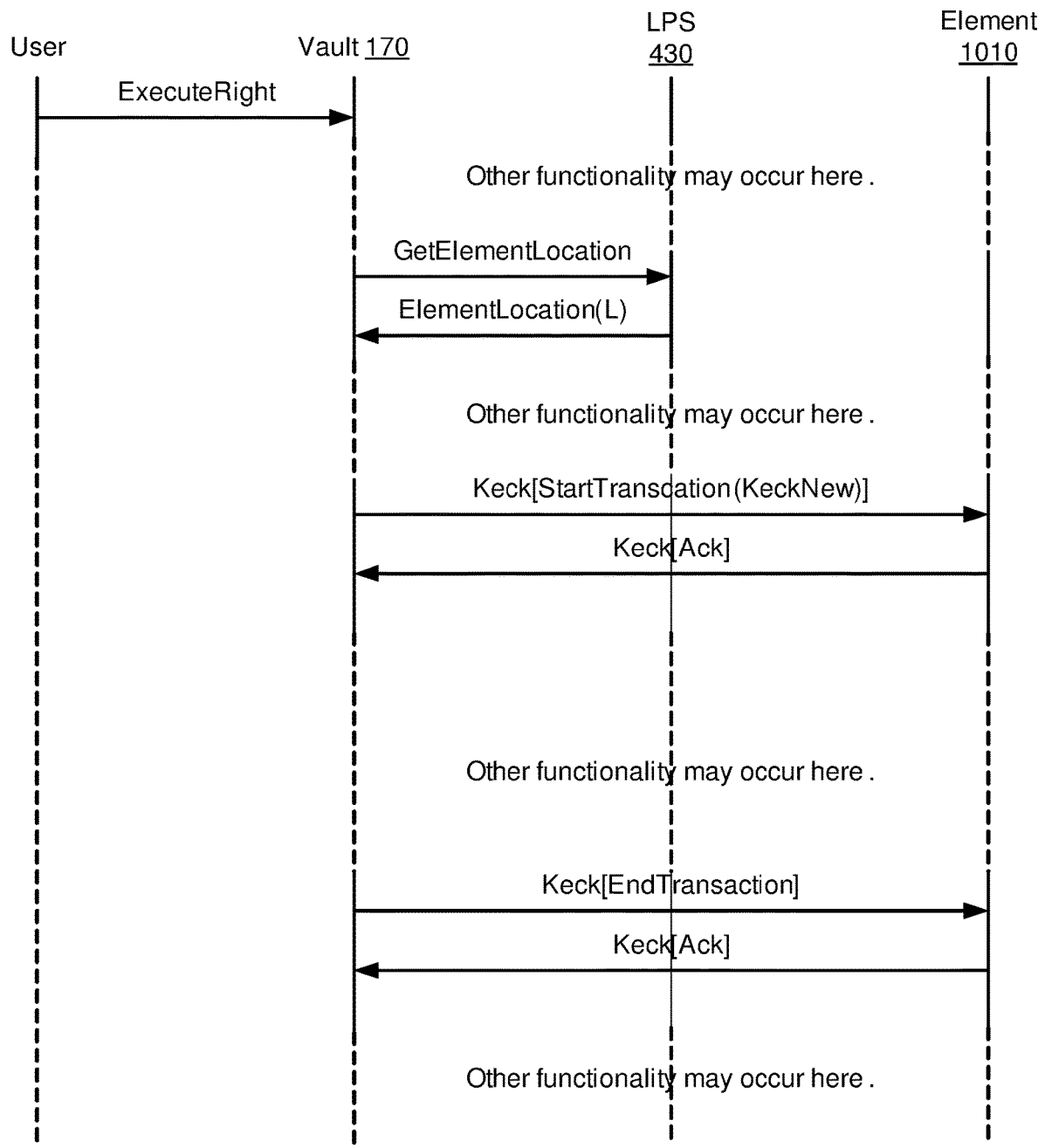
FIG. 13 is a sequence diagram showing an example rolling key protocol that may be used for accessing an element.

Rolling Key Protocol:

FIG. 13 is an overview of how the rolling key protocol works for elements within the Skif. All communication for control of the element is through the vault. The vault may set up other connections to/from the element, but control traffic is not sent over such a link. An example of such data traffic is from a video camera.

The vault changes the rolling key at a minimum of once per transaction, where a transaction could be from the execution of a right. A transaction may also be autonomously performed by the vault as part of managing the element. The unique aspect of this rolling key protocol is that the LPS system is used to ensure that the element has not left the area, and hence we can be relatively certain that the element was not physically tampered with since the last time the rolling keys were changed. Different behaviors are available for different element types. If an element is meant to be stationary, then the secure session to it can be terminated if the element moves, even if the element does not leave the LPS Zone. For elements that are intended to move within the LPS Zone, the secure session is torn down when the element leaves the area of its intended use. This area can be a subset of the LPS Zone.

The messages in FIG. 13 are intended as generic place holders for specific implementations that perform the equivalent functionality.

1. ExecuteRight: The user requests the vault to execute a right on a particular element.

The vault may perform other functions and send other messages at this point that are not pertinent to the discussion at hand. This is the purpose of the dotted lines. They indicate that other messages may or may not be sent, depending on the circumstances.

2. GetElementLocation: The vault requests the location of the element. The purpose of showing this is that the vault needs to know if the session should be torn down or kept. The LPS system can also alert when movement is detected is on the element. In other words, the location information can be pushed or pulled from the LPS system.

3. ElementLocation(L): The LPS system responds back with the location of the element.
4. StartTransaction(KeckNew): The vault informs the element that it is starting the transaction. Some transactions may be as simple as a call and a response, indicating that the new rolling encryption key needs to be sent immediately. The transaction may also fail at some point during its execution. There must be a systematic method of determining the key to use at any given time. The rule we use is that the next transaction uses the new key, whether or not the previous transaction completed in success or error. The only exception is if the new key is not committed at the vault.
5. Ack: This commits that the new key will be used at the next transaction attempt—no matter how the previous transaction concluded.
6. EndTransaction: The vault informs the element that the transaction is complete. The next communication from the vault will use the new rolling key.
7. Ack: The element confirms end of transaction.

Wired SKIFs

In combination with the wireless solution, a wired Skif is presented. A wired Skif is similar to a single antenna Skif in that position within the SKIF is not known, just containment within the Skif. What is needed is a protocol that runs independently from the normal operation of the network that ensures that computers are local when they claim to be. This is a containment protocol, the requirements of which are as follows:

LPS and vault network traffic are tagged as separate traffic flows.

Vault network devices and elements must be able to inform the LPS router of their location. It is not required to detect as legitimate or not, just local or not.

All LPS flow traffic is sent to the LPS system and nowhere else.

All vault flow traffic is sent to the vault and nowhere else.

The hubs, switches, and routers in the local network may not have the ability to insert packets into the network destined to the LPS system or vault.

Only valid nodes may participate in the LPS protocol.

The routing or switch entries on switches and routers used to pass data to the LPS system and vault may not be modified in any manner by software running on the switches and routers. The routing for LPS system and vault traffic is performed automatically by hardware is not modifiable by any person or software entity.

The LPS system and vault are the only components with the authority to initiate the process of finding the routes.

Figure 14:
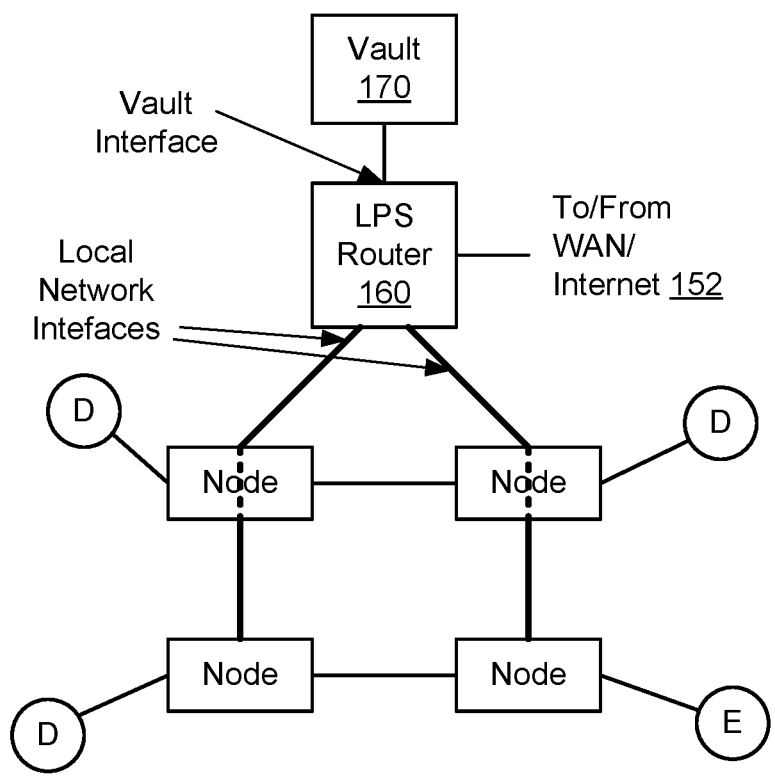
FIG. 14 is a block diagram of an example wired network with a spanning tree.

The above requirements are met by the use of a secure spanning tree protocol, the root of which is the LPS Router. Since the vault is directly connected to the LPS Router, flows to the vault are easily achieved as well. The root uses public key encryption to ensure that no other node could be inserted into the network and take over as root. FIG. 14 shows an example network with an example spanning tree highlighted.

The unique characteristics of this spanning tree protocol are as follows:

The entire protocol runs in hardware on the nodes.
The root maintains its identity via public key encryption.
The root communicates to nodes via public key encryption.
Nodes sign flow traffic destined to the root. Only signed flow traffic is accepted at the root.

Figure 15:
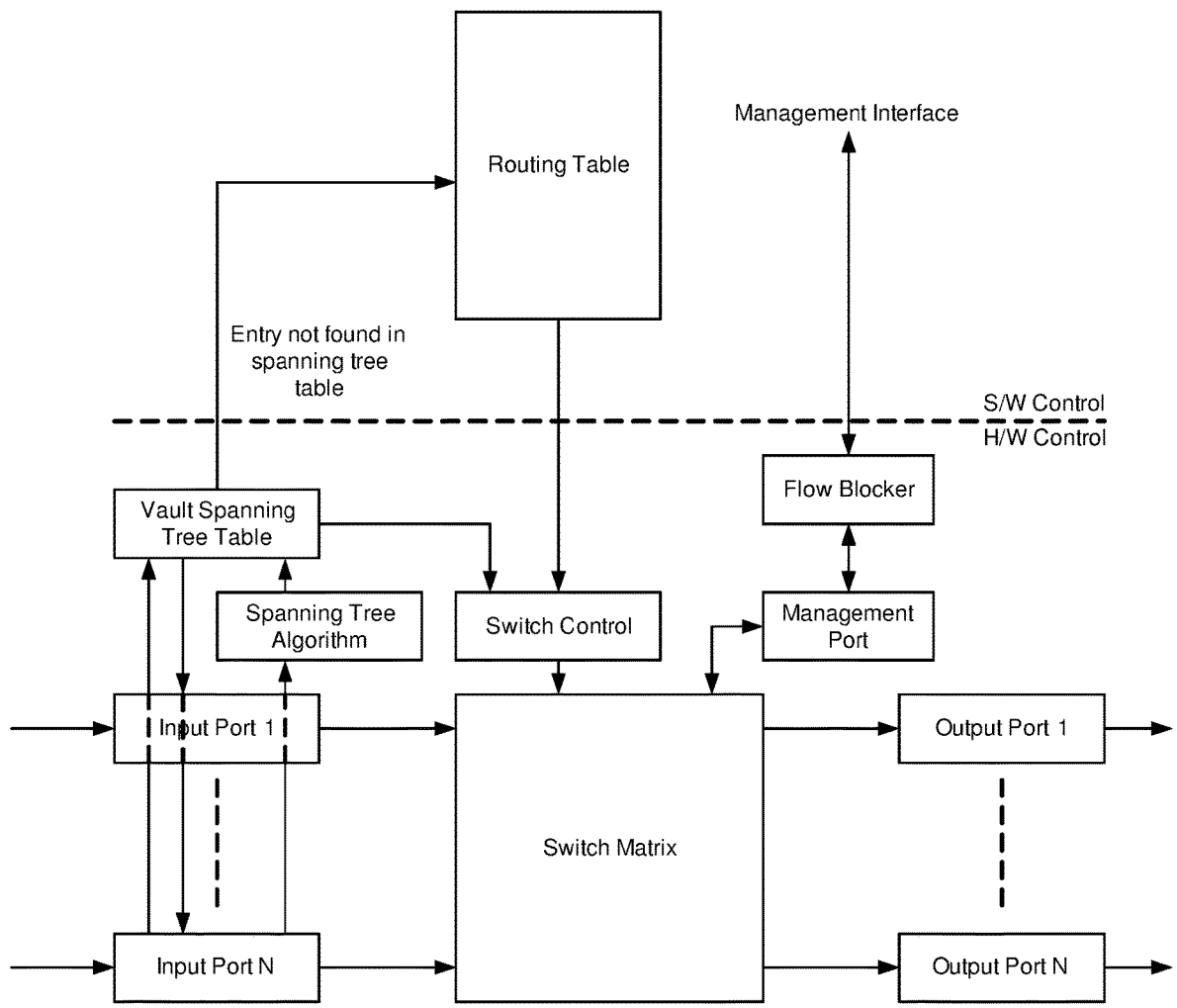
FIG. 15 is a block diagram of an example node in the spanning tree of FIG. 14.

FIG. 15 shows a simplified block diagram of the pertinent parts of a node is shown below. This diagram does not differentiate between switches or routers.

When flow traffic enters the node, the Vault Spanning Tree Table informs the Input Port to sign the packet with the unique digital signature for the flow/node pair.

The spanning tree protocol works as follows.

The root sends a discovery packet that is broadcast to the entire local network. This discovery packet contains a public key for the root, a flow identifier, and a protocol iteration number. The flow identifier tells the nodes which flow, or flows, is being programmed with this spanning tree. The first time a node receives this discovery packet it labels the port it received it on as the root port. The protocol iteration number is saved at each node to permit the node to recognize when a new spanning tree is being formed. Any flow traffic destined for the root is sent out the root port. The node then announces itself to the root using the root's public key to encrypt the data destined to the root in the announce packet. The encrypted data includes the node ID, a random number, and a node public key. Each node that receives this packet on its way back to the root inserts an entry into its spanning tree table to indicate how to get to the given node ID. (Note the node ID is also present in the packet in unencrypted form.) The node then forwards the original discovery packet out all interfaces that have not received a discovery packet yet. This process continues at each node until all nodes are discovered.

The integrity of the root node is protected by the public key of the root. The nodes will not respond to a request when an unknown key is used. The root may change the keys but the previous key is always needed to perform this operation.

The final issue is dealing with the insertion of rogue nodes into the spanning tree. The vault network cannot stop someone with physical access to the facility from inserting custom hardware into the network. In this case the purpose of the hardware would be to interact with the spanning tree protocol but be generally invisible otherwise. The goal for the intruder is to connect device hardware to the network and make it appear as if it is local. The first step to this is to make the LPS system believe the offending device is local. With custom rogue node hardware it is possible to tunnel a signal outside of a facility and thus make it appear a device is local. One way to combat this is to have each legitimate node in the spanning tree sign the flow traffic that enters into the spanning tree. The root can check the signature of each node and hence knows if the flow traffic is valid.

Once the tree has been determined to be complete, the tree can be annealed, meaning that the root broadcasts a packet to all nodes indicating that training is complete.

Examples of Flow Traffic are:

LPS: LPS locator packets.
Vault: All traffic to elements. All traffic related to execution of rights. Note that data traffic as a result of the execution is not part of the flow traffic.

Spanning tree is admittedly very inefficient in its use of network resources. Many network links will not be utilized. This can be seen even in the simple example shown in FIG. 14. The point is, it does not matter. The amount of traffic being sent over these flows is miniscule compared to the capacity of the typical network. A simple highly secure implementation is far more important than network usage optimization of an insignificant quantity of data.

Bidirectional Routing Using the Spanning Tree

Expanding upon the concepts of the Wired SKIF, both LPS system traffic and vault network traffic flow on logical star networks. The spanning tree protocol of FIG. 14 provides the method for information from the devices and elements to be sent to the LPS system and vault. A simple learning algorithm, implemented in hardware on the nodes of the local network, permits the LPS system and vault to send traffic back to the devices and elements. Only packets labeled as belonging to a flow would be sent in this manner; all other traffic would use regular routing to find its way to the destinations. Furthermore, the annealing process must be complete before traffic is permitted in the reverse direction.

Using this method, vault network traffic travelling over such flows cannot be diverted to a listener, thus eliminating the possibility of a man in the middle attack. Even if a hacker is able to gain control of a node in the local network, he would not be able modify the spanning tree tables to multicast the traffic to another device. This is because the software on the nodes has no access to the spanning tree table, and the hardware does not permit multicast on flow traffic.

The protocol for programming the spanning tree tables for traffic in the reverse direction, root to device, is given below. This protocol is sufficient because of the nature of the traffic between devices and the roots, vault and LPS. The devices always initiate the conversation.

The protocol is as follows. A device or element sends a packet to a root, vault or LPS system. The packet will follow the spanning tree as described in FIG. 14 to the root of the spanning tree. At each node, if there is not already, an entry is added into the spanning tree table for the reverse direction. Let the device port be the port that the packet arrived on the node. The entry added for the given device Id is from root port to device port. Therefore when the root sends a packet to a device or element on a flow, the nodes look up the device ID in the spanning tree table for the port to forward the packet on.

Addressing in the SKIF

The vault network's unique network topology and Skif functionality permit a rather unique addressing method that enables devices and elements to effortlessly connect securely to the local vault and local LPS system. Within a Skif there exists exactly one vault and exactly one LPS system. Skifs may not overlap, so even if the signal from a device is received on antennas in more than one Skif, the device is detectably within a single Skif. This implies that devices and elements need not know the network address of the local vault or local LPS system in order to communicate with them. The devices simply need to use a generic label to indicate that a packet is destined to the local vault or local LPS.

If a device is outside of a legitimate Skif, it may still safely send vault network traffic intended to locate the local vault and LPS system. This is true because of the nature of the vault network. Devices do not reveal secrets to the local vault; devices use the local vault to get a secure session back to its home vault. The use of public key encryption insures that even an untrusted network cannot intercept the communication to the home vault and that no one may spoof the device into thinking another component is the device's home vault. Likewise, announcing your presence to a rogue LPS system will cause no harm to the device nor yield any information useful to the rogue LPS system. The best they could do is track the location of the device. There is nothing that a wireless device can do to combat this, short of super specialized shaped antennas or the simple solution of not sending any data.

What is claimed is:

1. A method of controlling access to a computer network, the method comprising:

receiving wireless signals by each of multiple antennas of an electronic system;

processing the wireless signals received by the antennas to measure locations of electronic devices that originate the wireless signals;

allowing a first electronic device to communicate on the computer network via the antennas in response to a measured location of the first electronic device falling within a predefined physical region relative to the antennas; and blocking a second electronic device from communicating on the computer network via the antennas in response to a measured location of the second electronic device falling outside the predefined physical region relative to the antennas, wherein the electronic system further includes a base station coupled to the antennas and to a router coupled to the computer network, the base station operating on a per-packet basis selectively (i) to pass network packets received from the antennas to the router in response to a source of the packets falling within the predetermined physical region and (ii) to block network packets received from the antennas from reaching the router and therefore from reaching the computer network in response to the source of the packets falling outside the predetermined physical region, wherein processing the wireless signals to measure locations of the electronic devices includes generating the locations based at least in part on differences in arrival times of packets received by the multiple antennas, wherein each of the multiple antennas is coupled to a respective antenna circuit, wherein the wireless signals convey network packets, and wherein the method further comprises:

measuring, by each antenna circuit, a TOA (Time of Arrival) of each of multiple network packets as received by the antenna coupled to that antenna circuit;

demodulating, by each antenna circuit, the wireless signals to recover network packets as received by the antenna coupled to that antenna circuit; and arranging, by the base station, network packets recovered by the antenna circuits into respective packet groups based at least in part on TOA, each packet group including one packet from each antenna circuit and representing a single packet as transmitted by an originating device.

2. The method of claim 1, wherein arranging network packets into packet groups includes grouping together network packets having TOA values that fall within a predetermined time interval.

3. The method of claim 2, wherein the predetermined time interval is based on a reception range of the multiple antennas.

4. The method of claim 1, wherein each of the recovered network packets includes a device identifier that identifies the originating device, and wherein arranging packets into respective packet groups is further based on matching network packets based on device identifiers, such that the network packets arranged in each packet group all identify the same originating device.

5. The method of claim 4, further comprising:
sending, by the base station, a timing signal to each of the antenna circuits; and
adjusting, by at least one of the antenna circuits, a phase of the timing signal to synchronize the timing signal across all of the antenna circuits.

6. The method of claim 4, further comprising:
identifying a closest antenna, from among the multiple antennas, that is physically closest to the first electronic device; and
sending outgoing packets to the first electronic device using the closest antenna or another antenna co-located with the closest antenna.

7. The method of claim 6, wherein identifying the closest antenna is performed by identifying the antenna whose antenna circuit measures a smallest TOA in response to an incoming packet from among all antenna circuits in the electronic system.

8. The method of claim 1, further comprising selecting, by the base station, a representative packet from each packet group,
wherein allowing the first electronic device to communicate on the computer network includes passing a representative packet received from the first electronic device to a router connected to the computer network, and
wherein blocking the second electronic device from communicating on the computer network includes preventing a representative packet received from the second electronic device from reaching the router, such that the representative packet from the second electronic device never enters the computer network.

9. The method of claim 8, wherein the base station selectively passes or prevents network packets from reaching the router on a per-representative-packet basis.

10. The method of claim 1, further comprising defining the physical region using a training protocol wherein a training device is moved to different locations while the electronic system monitors the different locations to define a perimeter of the physical region.

11. The method of claim 1, wherein processing the wireless signals received by the antennas to measure the locations of electronic devices is performed using hardware and/or firmware whose processing cannot be altered by any user of the electronic system.

12. The method of claim 1,
wherein the computer network includes a vault appliance connected to the computer network, the vault appliance storing definitions of rights and dispatching the rights in response to receiving validated right requests from devices, and
wherein the method further comprises communicating the measured location of the first electronic device from the base station to the vault appliance to enable the vault appliance to use the measured location of the first electronic device in validating right requests received from the first electronic device.

13. The method of claim 12, wherein the vault appliance stores an attribute that identifies the first electronic device as a roaming device, and wherein the method further comprises:
implementing, by the vault appliance, a higher level of validation required to dispatch a right requested by the first electronic device when the first electronic device is outside the predefined physical region than when the first electronic device is within the predefined physical region.

14. The method of claim 13, wherein the vault appliance associates different subspaces within the predefined physical region with different validation requirements, such that right requests from the first electronic device require stricter validation when the first electronic device is located in one subspace than when the first electronic device is located in another subspace.

15. The method of claim 1, wherein the base station operating on the per-packet basis includes the base station generating an inside/outside flag and determining whether to pass or block a packet based on the inside/outside flag.

16. An electronic system for controlling access to a computer network, the electronic system comprising:
multiple antennas configured to receive wireless signals;
a router coupled to the computer network; and
control circuitry constructed and arranged to:
process the wireless signals received by the antennas to measure locations of electronic devices that originate the wireless signals;
allow a first electronic device to communicate on the computer network via the antennas in response to a measured location of the first electronic device falling within a predefined physical region relative to the antennas; and
block a second electronic device from communicating on the computer network via the antennas in response to a measured location of the second electronic device falling outside the predefined physical region relative to the antennas,
wherein the control circuitry is further constructed and arranged to selectively pass or prevent network packets of the wireless signals received by the antennas from reaching the router and from reaching the computer network on a per-packet basis,
wherein the control circuitry includes a base station, wherein each of the multiple antennas is coupled to a respective antenna circuit, wherein each antenna circuit is coupled to the base station, wherein the wireless signals are arranged to convey network packets, and wherein the control circuitry is further constructed and arranged to:
measure, by each antenna circuit, a TOA (Time of Arrival) of each of multiple network packets as received by the antenna coupled to that antenna circuit;
demodulate, by each antenna circuit, the wireless signals to recover network packets as received by the antenna coupled to that antenna circuit; and
arrange, by the base station, network packets recovered by the antenna circuits into respective packet groups based at least in part on TOA, each packet group including one packet from each antenna circuit and representing a single packet as transmitted by an originating device.

17. The electronic system of claim 16, wherein the control circuitry, constructed and arranged to process the wireless signals, is further constructed arranged to generate the locations based at least in part on differences in arrival times of packets received by the multiple antennas.

18. The electronic system of claim 16, wherein the control circuitry constructed and arranged to arrange network packets into packet groups is further constructed and arranged to group together network packets having TOA values that fall within a predetermined time interval.

19. The electronic system of claim 16,
wherein the control circuitry is further constructed and arranged to select a representative packet from each packet group,
wherein the control circuitry constructed and arranged to allow the first electronic device to communicate on the computer network is further constructed and arranged to pass a representative packet received from the first electronic device to the router, and
wherein the control circuitry constructed and arranged to block the second electronic device from communicating on the computer network is further constructed and arranged to prevent a representative packet received from the second device from reaching the router, such that the representative packet from the second electronic device never enters the computer network.

20. The electronic system of claim 19, wherein the base station is constructed and arranged to selectively pass or prevent network packets from reaching the router on a per-representative-packet basis.

21. A method of controlling access to a computer network, the method comprising:
receiving wireless packets by each of multiple antennas of an electronic system;
processing, by a base station, the wireless packets received by the antennas to measure locations of electronic devices that originate the wireless packets, the base station coupled to the antennas and to a router coupled to the computer network;
operating the base station on a per-packet basis selectively (i) to pass each of a first plurality of network packets to the router in response to measured source locations of the first plurality of network packets falling within a predefined physical region relative to the antennas and (ii) to block each of a second plurality of network packets from reaching the router and therefore the computer network in response to measured source locations of the second plurality of packets falling outside the predefined physical region relative to the antennas,
wherein each of the multiple antennas is coupled to a respective antenna circuit, and wherein the method further comprises:
measuring, by each antenna circuit, a TOA (Time of Arrival) of each of multiple network packets as received by the antenna coupled to that antenna circuit; and
arranging, by the base station, network packets recovered by the antenna circuits into respective packet groups based at least in part on TOA, each packet group including one packet from each antenna circuit and representing a single packet as transmitted by an originating device.

22. The method of claim 21, further comprising:
storing, by a vault appliance connected to the computer network, definitions of a set of rights;
dispatching, by the vault appliance, one or more of the set of rights in response to receiving validated right requests from a set of devices, and
communicating measured source locations of packets from the base station to the vault appliance to enable the vault appliance to use the measured locations in validating the right requests.

23. The method of claim 22, wherein the vault appliance stores an attribute that identifies a particular electronic device as a roaming device, and wherein the method further comprises:
implementing, by the vault appliance, a higher level of validation required to dispatch a right requested by the particular electronic device when the particular electronic device is outside the predefined physical region than when the particular electronic device is within the predefined physical region.

24. The method of claim 23, wherein the vault appliance associates different subspaces within the predefined physical region with different validation requirements, such that right requests from the particular electronic device require stricter validation when the particular electronic device is located in one subspace than when the particular electronic device is located in another subspace.

* * * * *